US011829315B2

(12) United States Patent
Kim

(10) Patent No.: US 11,829,315 B2
(45) Date of Patent: Nov. 28, 2023

(54) ELECTRONIC DEVICE INCLUDING A STRUCTURE IN WHICH AN INSERTABLE DEVICE IS INSERTABLE AND METHOD FOR OPERATING THE SAME

(71) Applicant: Samsung Electronics Co., Ltd., Suwon-si (KR)

(72) Inventor: Jisang Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 17/545,458

(22) Filed: Dec. 8, 2021

(65) Prior Publication Data
US 2022/0188258 A1 Jun. 16, 2022

Related U.S. Application Data

(63) Continuation of application No. PCT/KR2021/018115, filed on Dec. 2, 2021.

(30) Foreign Application Priority Data

Dec. 16, 2020 (KR) ........................ 10-2020-0176863

(51) Int. Cl.
*G06F 13/40* (2006.01)
*G06F 1/26* (2006.01)
(Continued)

(52) U.S. Cl.
CPC .......... *G06F 13/4081* (2013.01); *G06F 1/266* (2013.01); *G06F 1/3206* (2013.01);
(Continued)

(58) Field of Classification Search
CPC .... G06F 13/4081; G06F 1/266; G06F 1/3287; G06F 1/189; G06F 1/185; G06F 1/186;
(Continued)

(56) References Cited

U.S. PATENT DOCUMENTS 6,052,733 A * 4/2000 Mahalingam ........... H04L 45/58
714/24
6,138,194 A * 10/2000 Klein .................. G06F 13/4081
713/340

(Continued)

FOREIGN PATENT DOCUMENTS

JP 2002-152415 A 5/2002
JP 2005-057587 A 3/2005
(Continued)

OTHER PUBLICATIONS

International Search Report dated Mar. 4, 2022, issued in International Application No. PCT/KR2021/018115.

*Primary Examiner* — Thomas J. Cleary
(74) *Attorney, Agent, or Firm* — Jefferson IP Law, LLP

(57) ABSTRACT

An electronic device is provided. The electronic device includes a connector into which a first communication device can be inserted, a second communication device, a memory, and at least one processor, and the at least one processor may be configured to perform control such that first power is transferred to the first communication device connected through the connector, transmit and/or receive first data to and/or from a network by a use of the first communication device, obtain information related to an operation of the first communication device from the first communication device to store the obtained information related to the operation in the memory, and refrain from transferring the first power to the first communication device, transmit and/or receive second data by a use of the second communication device, refrain from using the second communication device, perform control such that second power is transferred to the first communication device, (Continued)

and transfer the obtained information related to the operation, stored in the memory, to the first communication device through the connector.

14 Claims, 17 Drawing Sheets

(51) Int. Cl.
*G06F 1/3234* (2019.01)
*G06F 1/3287* (2019.01)
*G06F 9/4401* (2018.01)
*G06F 1/3206* (2019.01)

(52) U.S. Cl.
CPC .......... *G06F 1/3278* (2013.01); *G06F 1/3287* (2013.01); *G06F 9/4411* (2013.01); *Y02D 10/00* (2018.01)

(58) Field of Classification Search
CPC ............ G06F 11/1446; G06F 11/1469; G06F 11/1441; G06F 11/2002; G06F 11/2005; G06F 11/2007; G06F 11/2012; G06F 11/2033; G06F 1/3206; G06F 1/3278; G06F 9/4411; H04L 12/4017; H04L 12/40176; Y02D 10/00
See application file for complete search history.

(56) References Cited

U.S. PATENT DOCUMENTS

| | | | | |
|---|---|---|---|---|
| 8,621,192 | B2* | 12/2013 | Oyama | G06F 9/4411 |
| | | | | 713/1 |
| 9,847,911 | B1* | 12/2017 | Gigandet | H04L 41/0886 |
| 2002/0078395 | A1* | 6/2002 | Wachel | G06F 11/2005 |
| | | | | 714/4.12 |
| 2003/0073457 | A1 | 4/2003 | Wang et al. | |
| 2005/0038986 | A1* | 2/2005 | Agan | G06F 9/4411 |
| | | | | 713/2 |
| 2006/0085540 | A1* | 4/2006 | Mayerson | H04L 43/0817 |
| | | | | 709/224 |
| 2006/0291378 | A1* | 12/2006 | Brotherston | H04L 45/22 |
| | | | | 370/221 |
| 2007/0140231 | A1* | 6/2007 | Deng | H04L 49/552 |
| | | | | 370/386 |
| 2013/0031296 | A1 | 1/2013 | Na | |
| 2014/0160922 | A1* | 6/2014 | Shiota | H04L 69/40 |
| | | | | 370/228 |
| 2016/0132456 | A1 | 5/2016 | Barga | |
| 2017/0339615 | A1* | 11/2017 | Zeng | H04W 84/12 |
| 2018/0207366 | A1 | 7/2018 | Marcoz et al. | |
| 2018/0241698 | A1 | 8/2018 | Zhao | |
| 2018/0356865 | A1 | 12/2018 | Chang et al. | |
| 2019/0302875 | A1* | 10/2019 | Nguyen | G06F 1/3206 |
| 2020/0119459 | A1 | 4/2020 | Fried et al. | |
| 2020/0213936 | A1* | 7/2020 | Fan | H04W 88/08 |
| 2020/0229082 | A1 | 7/2020 | Jang et al. | |
| 2020/0244410 | A1 | 7/2020 | Kim et al. | |
| 2021/0185389 | A1 | 6/2021 | Shin et al. | |

FOREIGN PATENT DOCUMENTS

| | | |
|---|---|---|
| JP | 2008-258767 A | 10/2008 |
| KR | 10-2008-0066345 A | 7/2008 |
| KR | 10-2009-0034140 A | 4/2009 |
| KR | 10-2012-0121742 A | 11/2012 |
| KR | 10-2014-0005488 A | 1/2014 |
| KR | 10-2015-0110100 A | 10/2015 |
| KR | 10-1854805 B1 | 6/2018 |
| KR | 10-2020-0029854 A | 3/2020 |

\* cited by examiner

ELECTRONIC DEVICE INCLUDING A STRUCTURE IN WHICH AN INSERTABLE DEVICE IS INSERTABLE AND METHOD FOR OPERATING THE SAME

CROSS-REFERENCE TO RELATED APPLICATION(S)

This application is a continuation application, claiming priority under § 365(c), of an International application No. PCT/KR2021/018115, filed on Dec. 2, 2021, which is based on and claims the benefit of a Korean patent application number 10-2020-0176863, filed on Dec. 16, 2020, in the Korean Intellectual Property Office, the disclosure of which is incorporated by reference herein in its entirety.

BACKGROUND

The disclosure relates to an electronic device including a structure into which an insertable device is inserted, and a method for operating same.

DESCRIPTION OF RELATED ART

Various kinds of electronic devices are widely used by consumers in modern times.

An electronic device may have a physical structure (for example, slot, socket, or connector) into which insertable devices (or modules) supporting a specific function (for example, communication function) can be inserted. An electronic device, when an insertable device is inserted therein, may be electrically connected to the insertable device and may use a specific function supported by the insertable device.

There have recently been increasing demands for insertable devices providing various functions for electronic devices, and there is thus a need to implement a technology for efficiently using and/or driving insertable devices inserted into electronic devices.

The above information is presented as background information only to assist with an understanding of the disclosure. No determination has been made, and no assertion is made, as to whether any of the above might be applicable as prior art with regard to the disclosure.

An insertable communication device (for example, communication module based on M.2 standard) may be inserted into a slot of an electronic device (for example, note personal computer (PC)) (hereinafter, referred to as host device), and may be connected to the electronic device electrically and/or operatively. The electronic device may transfer power to the inserted insertable communication device such that the insertable communication device is controlled to perform a booting operation based on an independently implemented operating system (for example, operating system (OS)) and to be driven accordingly. The electronic device may communicate with a specific network (for example, specific base station) based on a communication type (or communication scheme) (for example, $5^{th}$ generation (5G) communication) supported by the driven insertable communication device. If the insertable communication device needs not to be used, the electronic device may control power transfer to the insertable communication device to be suppressed such that the insertable communication device is turned off, thereby reducing power consumption. However, if the insertable communication device needs to be used again, it may take a considerable time for the electronic device to use the insertable communication device because the insertable communication device needs to re-perform the booting operation.

Aspects of the disclosure are to address at least the above-mentioned problems and/or disadvantages and to provide at least the advantages described below. According to various embodiments, an electronic device and a method for operating the same may back up operation information (or state information) of an insertable electronic device in the electronic device when the insertable communication device is turned off, and may control the electronic device so as to perform only a part of the booting operation if the insertable electronic device is reused, based on the backed-up information, thereby reducing the time necessary to use the insertable communication device.

Additional aspects will be set forth in part in the description which follows and, in part, will be apparent from the description, or may be learned by practice of the presented embodiments.

SUMMARY

According to various embodiments, there may be provided an electronic device. The electronic device includes a connector into which a first communication device can be inserted, a second communication device, a memory, and at least one processor, and the at least one processor may be configured to perform control such that first power is transferred to the first communication device connected through the connector, transmit and/or receive first data to and/or from a network by a use of the first communication device, based on an occurrence of a first event configured to stop the use of the first communication device while the use of the first communication device, obtain information related to an operation of the first communication device from the first communication device to store the obtained information related to the operation in the memory, and refrain from transferring the first power to the first communication device, based on refraining from transferring the first power to the first communication device, transmit and/or receive second data by a use of the second communication device, and based on an occurrence of a second event configured to start the use of the first communication device while the use of the second communication device, refrain from using the second communication device, perform control such that second power is transferred to the first communication device, and transfer the obtained information related to the operation, stored in the memory, to the first communication device through the connector.

According to various embodiments, there may be provided a method for operating an electronic device. The method includes performing control such that first power is transferred to a first communication device of the electronic device, connected through the connector of the electronic device, transmitting and/or receiving first data to and/or from a network by a use of the first communication device, based on an occurrence of a first event configured to stop the use of the first communication device while the use of the first communication device, obtaining information related to an operation of the first communication device from the first communication device to store the obtained information related to the operation in the memory of the electronic device and refraining from transferring the first power provided to the first communication device, based on refraining from transferring the first power to the first communication device, transmitting and/or receiving second data by a use of a second communication device, and based on an occurrence of a second event configured to start the use of the first communication device while the use of the second communication device, refraining from using the second communication device, performing control such that second power is transferred to the first communication device, and transferring the obtained information related to the operation, stored in the memory, to the first communication device through the connector.

According to various embodiments, there may be provided a communication device which can be inserted into an external electronic device. The communication device includes a memory, and a processor, wherein the processor is configured to receive first power from the external electronic device based on insertion into the external electronic device, perform a booting operation based on the received first power, perform at least one operation based on completion of the booting operation, transmit information of the processor and information of the memory to the external electronic device, based on occurrence of a first event configured to stop use of the first communication device while the at least one operation is performed, receive second power, information of the processor, and information of the memory from the external electronic device, based on occurrence of a second event configured to start the use of the first communication device, and perform only a part of the booting operation and restore execution of the at least one operation, based on the second power, the information of the processor, and the information of the memory.

Technical solutions according to various embodiments are not limited to the above-mentioned technical solutions, and other technical solutions not mentioned herein will be clearly understood from this specification and the appended drawings by those skilled in the art to which the disclosure pertains.

Various embodiments may provide an electronic device and a method for operating the same, wherein operation information (or state information) of an insertable electronic device is backed up in the electronic device when the insertable communication device is turned off, and the electronic device may be controlled so as to perform only a part of the booting operation if the insertable electronic device is reused, based on the backed-up information, thereby reducing the time necessary to use the insertable communication device.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
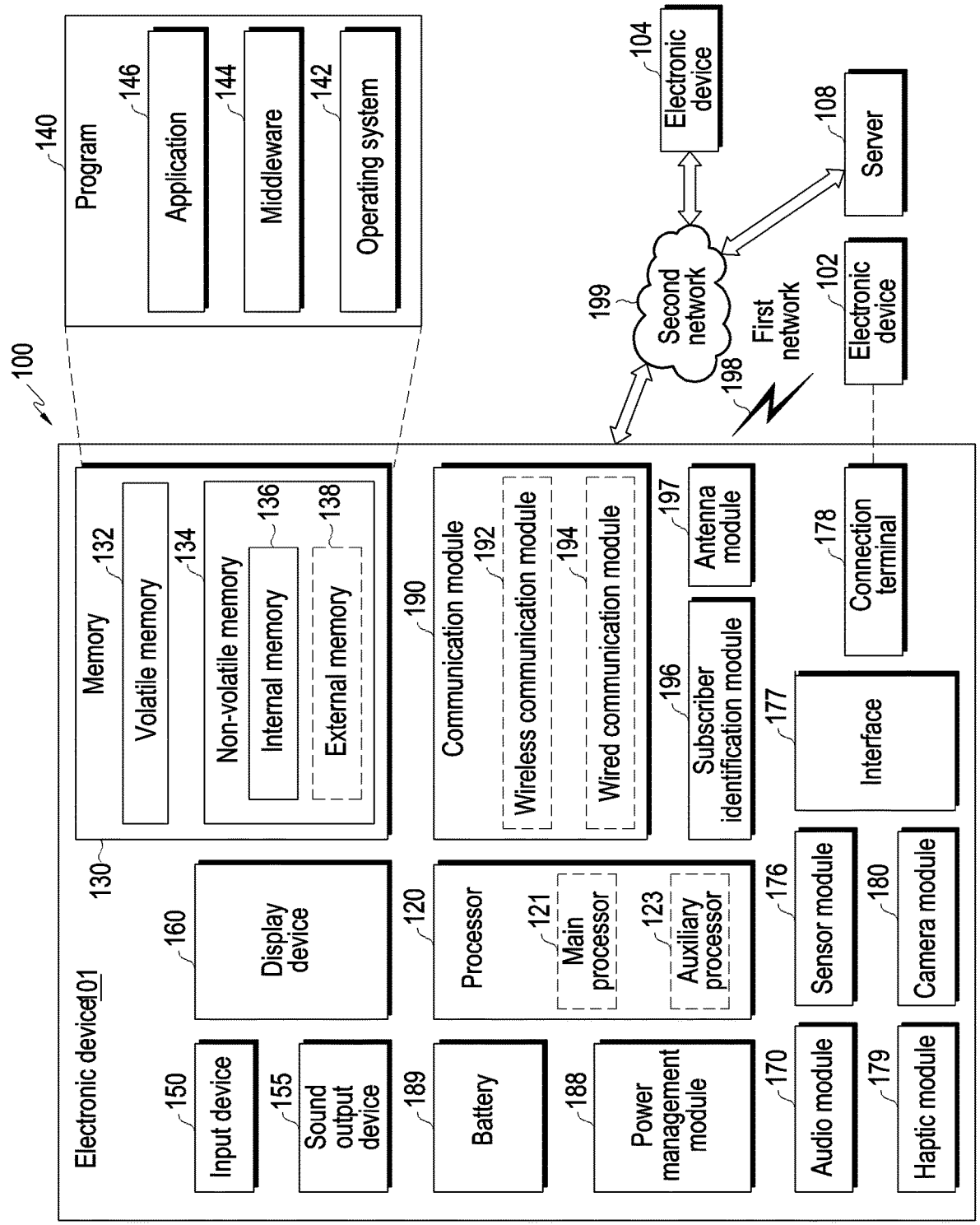
FIG. 1 is a block diagram of an electronic device in a network environment, according to various embodiments.

FIG. 1 is a block diagram illustrating an electronic device 101 in a network environment 100 according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, an example of an electronic device and a communication device insertable into the electronic device according to various embodiments will be described. Since an electronic device 101 provided in a network environment 100, described above in FIG. 1 can be applied correspondingly to an electronic device and a communication device of FIG. 2, a redundant description will be omitted.

Figure 2:
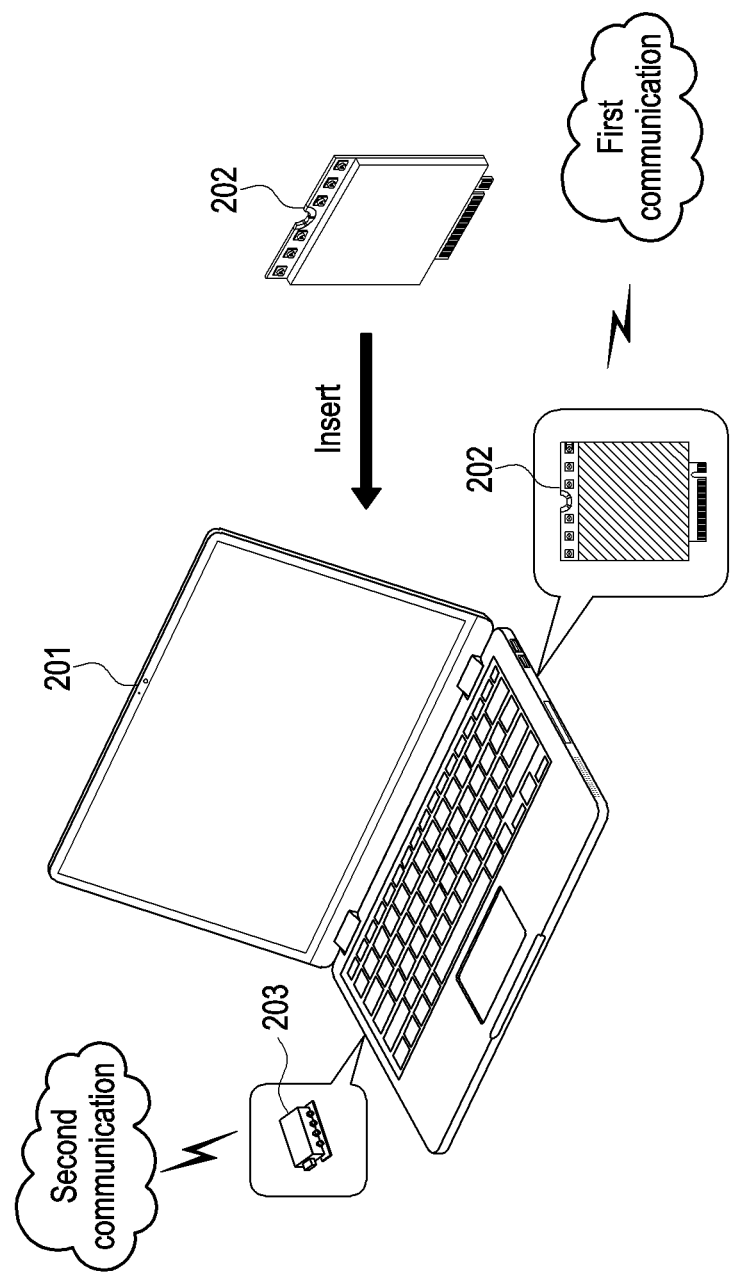
FIG. 2 illustrates an example of an electronic device and a communication device which can be inserted into the electronic device, according to various embodiments.

FIG. 2 illustrates an example of an electronic device and a communication device insertable into the electronic device, according to various embodiments.

According to various embodiments, as shown in FIG. 2, an electronic device 201 and a first communication device 202 insertable into the electronic device 201 may be provided. Hereinafter, each of the electronic device 201 and the first communication device 202 will be described.

First, the electronic device 201 will be described.

According to various embodiments, the electronic device 201 may communicate using a plurality of communication devices (or plurality of communication modules) (e.g., the first communication device 202 and the second communication device 203). For example, the electronic device 201 may communicate using the first communication device 202 inserted into the electronic device (e.g., transmit data to a network (e.g., base station) and/or receive data from the network) and may communicate using the second communication device 203 embedded in the electronic device 201. For example, the plurality of communication devices (e.g., the first communication device 202 and the second communication device 203) may support cellular communication (or mobile communication), such as $3^{rd}$ generation (3G), $4^{th}$ generation long term evolution (4G LTE), long term evolution advanced (LTE-A), or 5G, short-range wireless communication, such as near field communication (NFC), radio frequency identification (RFID), Bluetooth, Bluetooth low energy (BLE), or Wi-Fi Direct, wireless communication using an access point (AP), such as Wi-Fi and wireless LAN (W-LAN), and wired communication such as a personal area network (PAN), such as USB or Ethernet. In this case, the plurality of communication devices (e.g., the first communication device 202 and the second communication device 203) may be implemented to support communication methods (or schemes) (e.g., first communication and second communication) different from each other, respectively, as shown in FIG. 2. For example, the first communication device 202 may be implemented to support cellular communication, such as 5G, and the second communication device 203 may be implemented to support short-range wireless communication (e.g., WLAN) or wired communication (PAN), which is different therefrom. Without being limited thereto, the plurality of communication devices may support various communication schemes.

According to various embodiments, the electronic device 201 may include a physical structure enabling an insertable device (e.g., the first communication device 202) to be inserted thereinto. For example, the electronic device 201 may include a region having a physical structure, such as a slot or a socket into which the first communication device 202 can be inserted, and/or a connector. The physical structure may be implemented to correspond to a standard (e.g., M.2) of the first communication device 202 inserted into the electronic device 201. The first communication device 202 inserted into the electronic device 201 may be electrically and/or operatively connected to the electronic device 201. In another example, the electronic device 201 may include a physical structure or a connection device (e.g., connector) capable of being electrically and/or operatively connected to the first communication device 202. The meaning of being electrically connected to the electronic device 201 may refer to that power, a signal (e.g., control signal of a processor of the electronic device 201), information, and data are transmitted and/or received between the electronic device 201 and the first communication device 202. The meaning of being operatively connected to the electronic device 201 may refer to that the first communication device 202 is connected to the electronic device 201 such that the operation of the electronic device 201 is based on the first communication device 202 (e.g., transmitting and/or receiving data using the first communication device 202) or the operation of the first communication device 202 is performed based on the electronic device 201 (e.g., the electronic device 201 provides power for the first communication device 202 to perform a booting operation). The insertion of the first communication device 202 into the electronic device 201 and electrical connection or operative connection of the first communication device 202 to the electronic device 201 by the insertion will be described later in FIGS. 5, 6, and 7.

According to various embodiments, the electronic device 201 may include various types of computers. For example, the electronic device 201 may include a notebook computer, including a standard notebook, an ultra-book, a netbook, and a tab-book, a laptop computer, a tablet computer, and a desktop computer. Without being limited thereto, the electronic device 201 may be various types of devices having a physical structure including a slot or a socket into which the first communication device 202 can be inserted, or a connection device (e.g., connector) for the first communication device 202. For example, the electronic device 201 may be a portable terminal provided with a slot into which the first communication device 202 can be inserted.

Hereinafter, the first communication device 202 will be described.

According to various embodiments, the first communication device 202 may support various types of communication. For example, the first communication device 202 may perform a control operation for various types of communication. For example, the first communication device 202 may perform a control operation for cellular communication (or mobile communication), such as 3G, 4G LTE, LTE-A, or 5G, short-range wireless communication, such as NFC, RFID, Bluetooth, BLE, or Wi-Fi Direct, wireless communication using an AP (access point), such as Wi-Fi, and wired communication, such as, USB or Ethernet. When the first communication device 202 is inserted into the electronic device 201 to be electrically or operatively connected to the electronic device 201, the first communication device 202 may perform an operation such that data and/or information is transmitted to and/or received from the outside (e.g., network or base station) according to a communication scheme supported by the first communication device 202. Based on the operation of the first communication device 202, the electronic device 201 may transmit and/or receive a communication signal, data, and/or information, based on various types of communication supported by the first communication device 202.

According to various embodiments, the first communication device 202 may be a device implemented by a specific interface standard (or specific physical standard). For example, the first communication device 202 may be an M.2 standard device. Without being limited thereto, the first communication device 202 may be a communication device of various standards, which can be inserted into the electronic device 201.

According to various embodiments, the first communication device 202 may be a device having an operating system separately from the electronic device 201. For example, the first communication device 202 may include a processor, and a memory including a program for driving an operating system. Accordingly, the first communication device 202 may perform a booting operation separately from the electronic device 201 and may perform a communication operation according to the communication scheme (e.g., radio resource control (RRC) connection to a specific network) supported by the first communication device 202, based on the completion of the booting operation.

On the other hand, without being limited thereto, the details described below may be applied correspondingly to, various types of devices (e.g., memory card, graphics card) insertable into electronic device 201 and having a separate operating system, other than the first communication device 202.

Hereinafter, an example of the electronic device 201 and the communication device according to various embodiments will be further described. Hereinafter, an example of a physical component and/or physical structure of the electronic device 201 and the first communication device 202, described above, will be further described with reference to FIGS. 3, 4A, and 4B.

Figure 3:
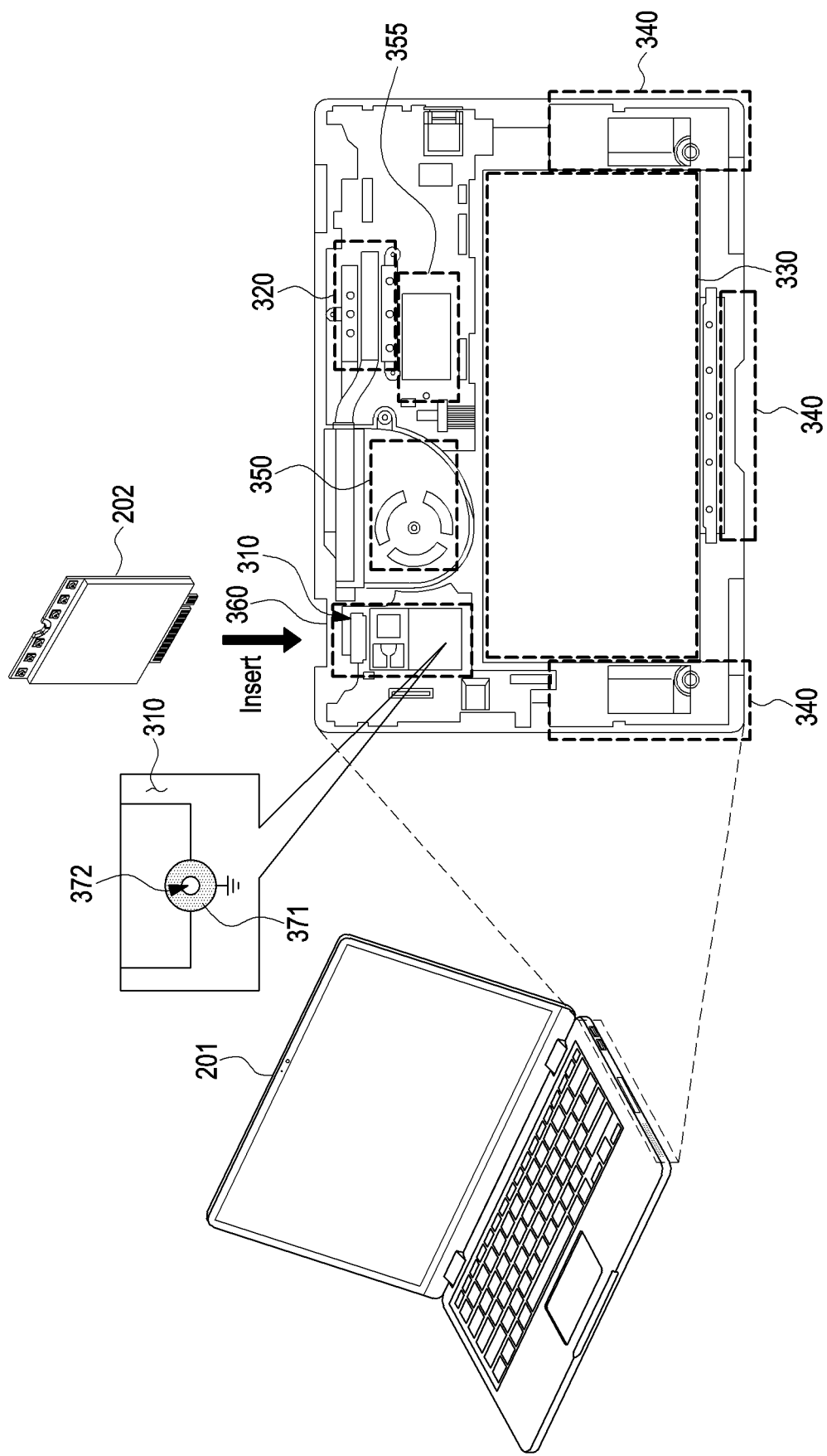
FIG. 3 illustrates an example of a physical component and/or a physical structure of an electronic device according to various embodiments.
Figure 4A:
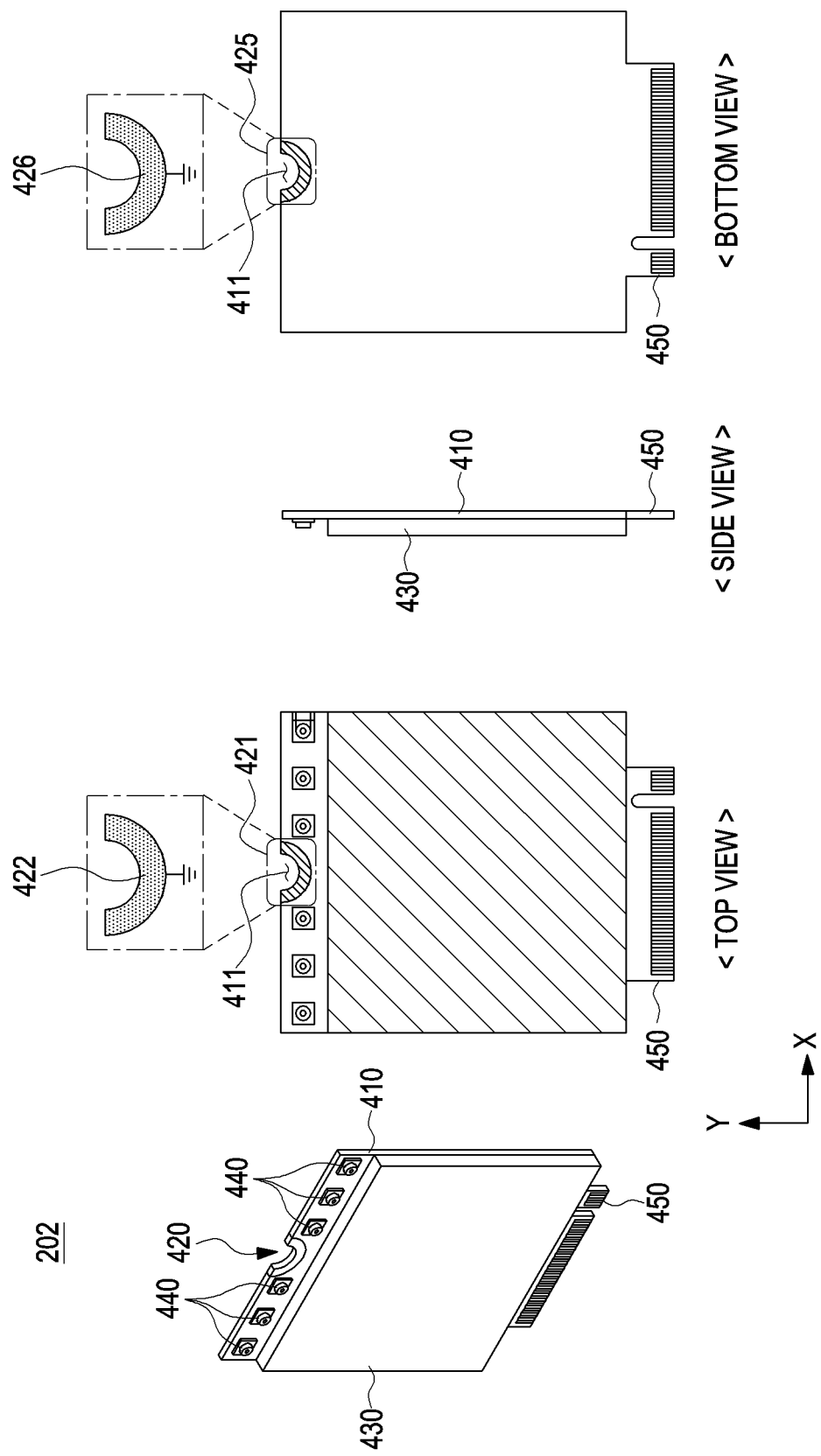
FIG. 4A illustrates an example of a physical component and/or a physical structure of a communication device according to various embodiments.
Figure 4B:
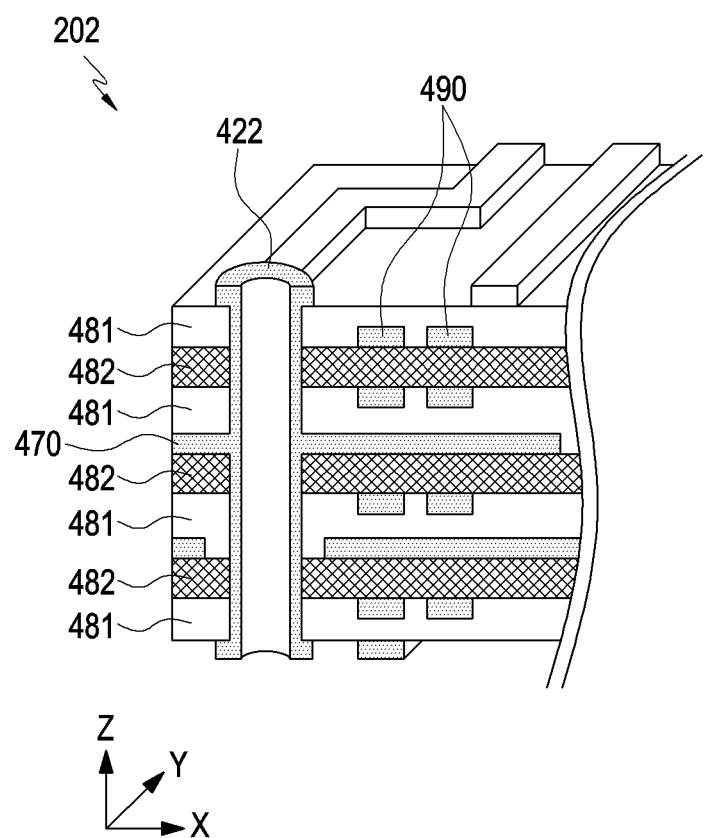
FIG. 4B is a side view of a portion of a substrate on which a ground pad of a communication device is disposed, according to various embodiments.

FIG. 3 illustrates an example of a physical component and/or a physical structure of an electronic device according to various embodiments. FIG. 4A illustrates an example of a physical component and/or a physical structure of a communication device according to various embodiments. FIG. 4B is a side view of a portion of a substrate on which a ground pad of a communication device is disposed according to various embodiments.

Referring to FIGS. 3, 4A, and 4B, an example of a physical component and/or a physical structure of the electronic device 201 will be described first.

According to various embodiments, referring to FIG. 3, the electronic device 201 may include a first substrate 310, a processor 320, a battery 330, a plurality of antennas 340, a fan 350, a memory 355, and a slot (socket or connector) 360 into which the first communication device 202 can be inserted. Without being limited thereto, the electronic device 201 may be implemented to include more components than those illustrated in FIG. 3 or to include fewer components than those illustrated in FIG. 3. For example, the components of the electronic device 201, described above with reference to FIG. 1, may be further implemented on the substrate of FIG. 3.

According to various embodiments, components of the electronic device 201 may be disposed on the first substrate 310. For example, the processor 320, the battery 330, the plurality of antennas 340, the fan 350, the memory 355, and the slot (socket or connector) 360 into which the first communication device 202 can be inserted may be disposed (or implemented) on the first substrate 310. Although not shown in FIG. 3, an input/output port and a circuit for integrating and connecting various cables or wires may be installed, in addition to the processor 320, the battery 330, the plurality of antennas 340, the fan 350, the memory 355, and the slot (socket or connector) 360 into which the first communication device 202 can be inserted. The substrate may include a mainboard, a motherboard (or mobo), a main circuit board, a base board, a planar board, or a system board. Since the substrate may be implemented as in a well-known technology, other detailed descriptions thereof will be omitted.

According to various embodiments, the processor 320 may generally control an operation of the electronic device 201. When the first communication device 202 is inserted into the electronic device 201 to be electrically connected thereto, the processor 320 may output a control signal for controlling a component (e.g., converter circuit) of the first communication device 202. The processor 320 may be an application processor (AP) including various types of processors, such as a central processing unit (CPU) and a graphics processing unit (GPU). Since the processor 320 may be implemented as in a well-known technology, other detailed descriptions thereof will be omitted.

According to various embodiments, the battery 330 may store power and may provide the stored power for an operation of the components (e.g., the processor 320) of the electronic device 201 and/or the first communication device 202. The power of the battery 330 may be converted by a first converter circuit (634 of FIG. 6) to be described later into power of a size required by the components of the electronic device 201 and/or the first communication device 202 and may be provided thereto. Since the battery 330 may be implemented as in a well-known technology, other detailed descriptions thereof will be omitted.

According to various embodiments, the plurality of antennas 340 may transmit a communication signal to the outside (e.g., network) or receive a communication signal therefrom. For example, the plurality of antennas 340 may transmit and/or receive a communication signal, based on a communication scheme (e.g., 5G) supported by the first communication device 202 according to the control of the inserted first communication device 202. Since the plurality of antennas 340 may be implemented as in a well-known technology, other detailed descriptions thereof will be omitted.

According to various embodiments, the fan 350 may rotate to dissipate heat generated according to the operation of the electronic device 201. Without being limited thereto, a cooler for dissipating waste heat of the electronic device 201 may be provided in the electronic device 201, other than the fan 350. Since the fan 350 may be implemented as in a well-known technology, other detailed descriptions thereof will be omitted.

According to various embodiments, the memory 355 may temporarily or semi-permanently store information related to the electronic device 201. The memory 355 may include a read-only memory (ROM) that stores an operating system (OS) for driving, and a random access memory (RAM) that stores data for hosting a web site data or data related to a program or an application (e.g., web applications). Since the memory 355 may be implemented as in a well-known technology, other detailed descriptions thereof will be omitted.

According to various embodiments, the slot (socket or connector) 360 into which the first communication device 202 can be inserted may be formed on the substrate in a structure of a physical standard corresponding to a physical standard (e.g., M.2) of the first communication device 202. For example, a structure 501, which will be further described later, in which a connector 503 for electrical connection to the first communication device 202 may be implemented in the slot 360. In another example, as shown in FIG. 3, a fastening structure to which the first communication device 202 can be fastened may be formed in the insertable slot. The fastening structure may include a hole 372 having a screw thread formed on the inner surface so that a fastening member (e.g., screw), which will be described later, is inserted to be fastened thereto. A ground pad 371 made of a conductive material may be disposed in a region (e.g., region around the entrance of the hole) adjacent to the substrate through which the fastening structure (e.g., hole) is formed. The ground pad 371 may be electrically connected to a ground circuit of the electronic device 201. The ground may serve as a common ground of devices (e.g., the first communication device 202 or the electronic device 201) and may be a reference point for signal lines connected to the ground. In addition, charges (or power) may be discharged from signal lines connected through the ground. When the first communication device 202 is fastened to the electronic device 201, the lower surface ground pad disposed on the lower surface of the substrate of the first communication device 202 may be in contact with the ground pad 371 of the slot and be electrically connected thereto, thereby securing the ground of the first communication device 202 (or securing the electrical stability), which will be described later.

Hereinafter, an example of a physical component and/or a physical structure of the first communication device 202 will be described.

According to various embodiments, referring to FIG. 4A, the first communication device 202 may include a second substrate 410 on which a fastening structure is formed, a ground pad 420, at least one circuit 430, an antenna connection part 440, and a contact part 450. Referring to FIG. 4B, the first communication device 202 may include a ground 470, an insulation layer (e.g., a PCB core 481 and PREPEG 482), and metal lines 490 to be connected to components (e.g., at least one circuit) of the first communication device 202, which are disposed inside the second substrate 410.

According to various embodiments, components (e.g., the ground pad 420, at least one circuit 430, the antenna connection part 440, and the contact part 450) of the first communication device 202 may be disposed (or implemented) on the second substrate 410. The second substrate 410 may be implemented in the form factor of the M.2 standard, as described above. Although not shown in FIG. 4A, an input/output port and a circuit for integrating and connecting various cables or wirings may be installed, in addition to the components (e.g., the ground pad 420, at least one circuit 430, the antenna connection part 440, and the contact part 450) of the first communication device 202. For example, the second substrate 410 may include metal lines 490 disposed inside thereof and connected to the components of the first communication device 202 as shown in FIG. 4B. The metal lines 490 may be electrically connected to the ground 470 through a via hole. Since the second substrate 410 may be implemented as in a well-known technology, other detailed descriptions thereof will be omitted.

According to various embodiments, a fastening structure to be fastened to the electronic device 201 may be formed on the second substrate 410. For example, the fastening structure of the first communication device 202 may include a recess region 411 formed inwardly from the side surface of the second substrate 410 of the first communication device 202, as shown in FIG. 4A. When the second substrate 410 of the first communication device 202 is placed on the substrate of the electronic device 201 according to the insertion of the first communication device 202 into the slot 360 of the electronic device 201, the fastening structure (e.g., the hole 372) of the slot 360 of the electronic device 201 may be exposed through the recess region 411. An example in which the second substrate 410 of the first communication device 202 and the first substrate 310 of the electronic device 201 are fastened to each other according to the insertion of a fastening member (e.g., screw) 510 through the recess region 411 of the fastening structure will be described later with reference to FIG. 5.

According to various embodiments, as shown in FIG. 4A, ground pads (e.g., 421 and 425) may be disposed on the upper surface region of the second substrate 410 and the lower surface region of the second substrate 410, through which the fastening structure is formed. For example, each of the ground pads disposed on the upper surface region and the lower surface region may include conductors 422 and 426. The conductor may be disposed on the upper surface of the second substrate 410 and the lower surface of the second substrate 410 along the recess region 411 of the fastening structure, recessed into the side surface of the second substrate 410 with a predetermined curvature. Among the conductors, the conductor disposed on the upper surface region of the second substrate 410 may be defined as an upper ground pad 421, and the conductor disposed on the lower region of the second substrate 410 may be defined as a lower ground pad 425. Each of the ground pads (e.g., the upper ground pad and the lower ground pad) may be electrically connected to the ground 470 formed inside the second substrate 410, as shown in FIG. 4B. In addition, when the first communication device 202 is fastened to the electronic device 201, the upper ground pad and the lower ground pad may be electrically connected to a ground implemented in the first substrate 310 of the electronic device.

According to various embodiments, the ground pads (e.g., 421 and 425) disposed on the upper or lower surface of the second substrate 410 are not limited to those shown in FIG. 4A and may be implemented in various forms.

According to various embodiments, the at least one circuit 430 may include components, such as a second processor 650 and memories 671 and 672, which are to be described later. Since at least one circuit provided in the first communication device 202 may be implemented as in a well-known technology, a detailed description thereof will be omitted.

According to various embodiments, the antenna connection part 440 may be electrically and/or operatively connected to each of the plurality of antennas of the electronic device 201. Since the antenna connection part 440 provided in the first communication device 202 may be implemented as in a well-known technology, a detailed description thereof will be omitted.

According to various embodiments, the contact part 450 may include a component (e.g., plurality of pins) to be electrically connected to the connector 503 of the slot 360 of the electronic device 201. As will be described later, in a state where the first communication device 202 is inserted into the slot 360 of the electronic device 201, the contact part 450 may be in contact with and/or connected to the connector 503 of the slot 360, and accordingly, an electrical component (e.g., power line and signal line) of the first communication device 202 and an electrical component (e.g., power line and signal line) of the electronic device 201 may be connected to each other, thereby enabling exchange of power, signal, data, and/or information between the components (e.g., a processor (e.g., 610 of FIG. 6 to be described later) of the electronic device 201 and a second converter circuit (e.g., 680 of FIG. 6 to be described later) of the first communication device 202). Since the contact part 450 provided in the first communication device 202 may be implemented as in a well-known technology, a detailed description thereof will be omitted.

Without being limited thereto, the details described below may be applied correspondingly to various types of devices (e.g., memory card and graphic card) insertable into the electronic device 201, other than the first communication device 202.

Hereinafter, an example of the first communication device 202, which is fastened to the electronic device 201, according to various embodiments will be described.

Figure 5:
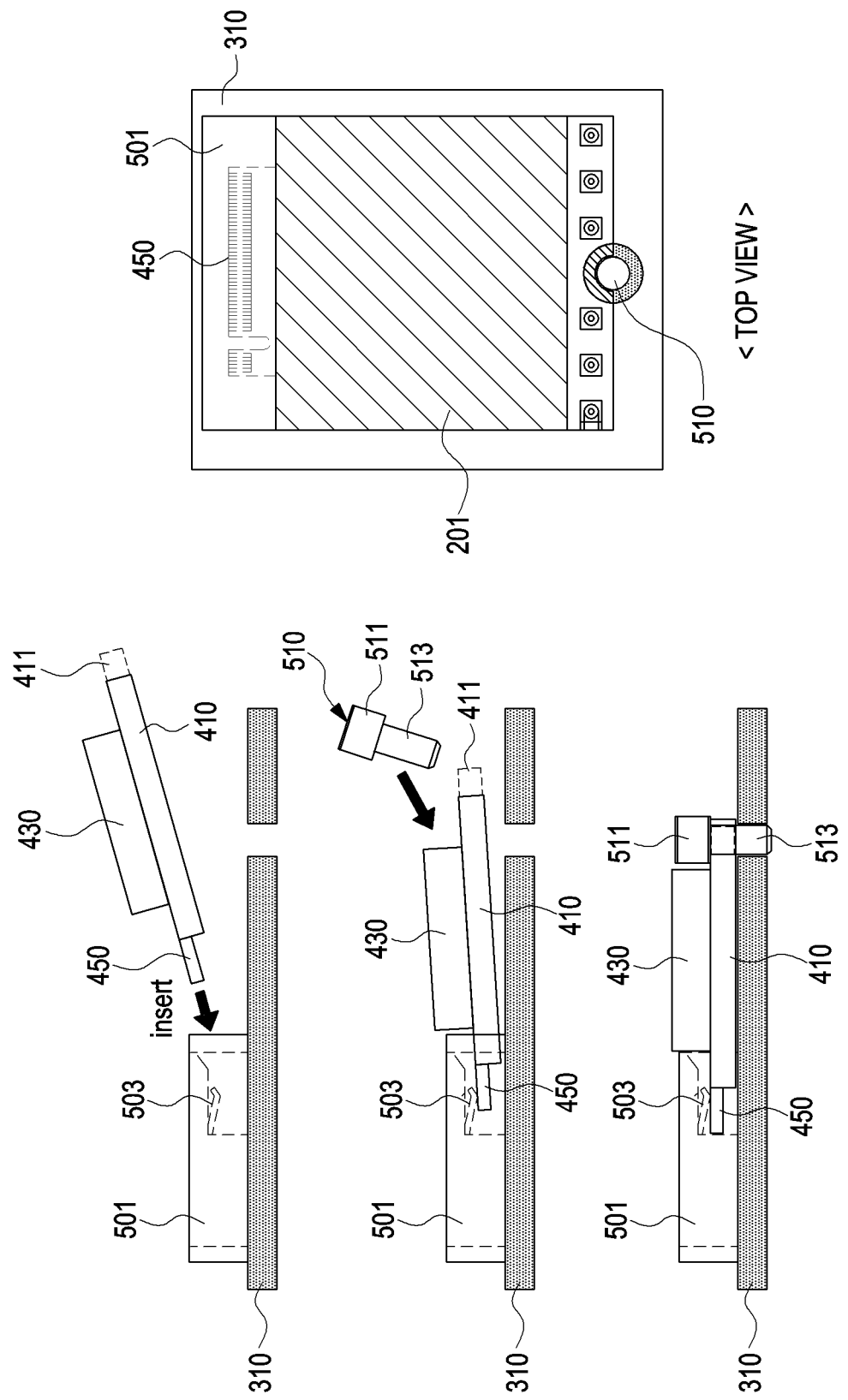
FIG. 5 illustrates an example of a communication device which is fastened to an electronic device, according to various embodiments.

FIG. 5 illustrates an example of a first communication device which is fastened to an electronic device, according to various embodiments.

According to various embodiments, as shown in FIG. 5, the slot 360 of the electronic device 201 may include a structure 501 including a connector 503 to be electrically connected to the contact part 450 of the first communication device 202. The connector 503 may include a plurality of pins for electrical connection and may enable electrical connection to the first communication device 202 by contact and/or connection to a plurality of pins included in the contact part 450 of the first communication device 202.

According to various embodiments, the first substrate 310 of the electronic device 201 and the second substrate 410 of the first communication device 202 may be fastened to each other in a state in which a part (e.g., the contact part 450) of the first communication device 202 is inserted into the slot 360 (e.g., the structure 501 in the slot 360) of the electronic device 201. Referring to FIG. 5, when the fastening member 510 (e.g., screw or members for fastening without being limited thereto) is fastened to the fastening structure of the first substrate 310 of the electronic device 201 through the recess region 411, which is the fastening structure of the second substrate 410 of the first communication device 202, in a state in which the second substrate 410 of the first communication device 202 is inserted into the structure 501 of the slot 360, the second substrate 410 of the first communication device 202 may be fastened to the first substrate 310 of the electronic device 201. The fastening member 510 may include a head 511, and a body 513 having a screw thread formed on an outer circumferential surface thereof, and each of the head 511 and the body 513 may be made of a conductive material to have conductivity. When the fastening member 510 is inserted into the fastening structure (e.g., hole (372 of FIG. 3)) of the electronic device 201, the screw thread formed on the outer circumferential surface of the body of the fastening member 510 and the screw thread inside the fastening structure (e.g., hole (372 of FIG. 3)) of the first substrate 310 of the electronic device 201 may be engaged with each other. The engagement may cause a force by the head 511 of the fastening member 510 to be applied from the upper surface of the second substrate 410 of the first communication device 202 toward the upper surface of the first substrate 310 of the electronic device 201, and accordingly, the second substrate 410 of the first communication device 202 and the first substrate 310 of the electronic device 201 may be firmly fastened to each other.

According to various embodiments, when the second substrate 410 of the first communication device 202 and the first substrate 310 of the electronic device 201 are completely fastened to each other by the fastening member 510, the ground pads (e.g., upper ground pad and lower ground pad) disposed on at least one of the upper surface or the lower surface of the second substrate 410 of the first communication device 202 may be electrically connected to the ground of the first substrate. For example, the lower ground pad 425 of the second substrate 410 may be in contact with the ground pad 371 formed in the fastening structure of the upper surface of the first substrate 310 of the electronic device 201, and the lower ground pad 425 may be electrically connected to the ground formed on the first substrate 310 through the ground pad 371 of the first substrate 310 of the electronic device 201. In addition, the upper ground pad may be electrically connected to the ground formed on the first substrate through the lower ground pad 425. Accordingly, the ground of the electronic device 101 may be used as a ground when the operation of the first communication device 202 is performed.

Hereinafter, examples of circuit components of the electronic device 201 and the communication device 202 which are electrically and/or operatively connected to each other according to the above-described insertion and fastening will be described. As will be described later, each of the electronic device 201 and the communication device 202 may store an OS, and may independently perform an operation, based on the driving of the stored OS.

Figure 6:
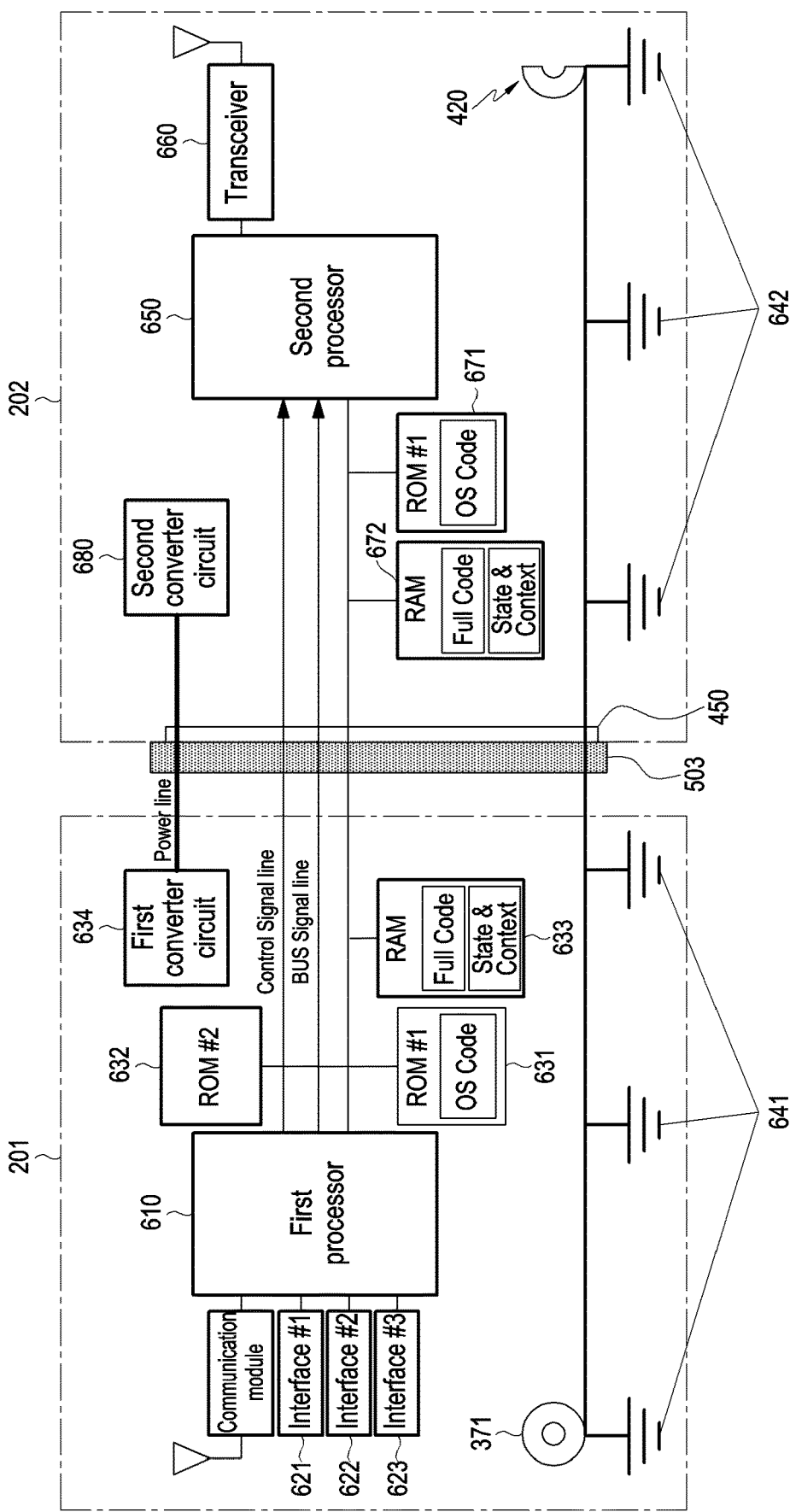
FIG. 6 illustrates an example of a circuit component of an electronic device and a circuit component of a communication device according to various embodiments.

FIG. 6 illustrates an example of a circuit component of an electronic device and a circuit component of a communication device according to various embodiments.

According to various embodiments, according to the insertion of the communication device 202 into the electronic device 201 (e.g., the contact part 450 of the communication device 202 is in contact with the connector 503 of the electronic device 201) and the connection between the electronic device 201 and the electronic device 201, at least some circuit components of the electronic device 201 and the communication device 202 may be electrically connected to each other as shown in FIG. 6.

For example, lines (or lanes) (e.g., power lines (power lane, power rail, power line), bus signal line, control signal line) for exchanging power, signal, information, and/or data between the electronic device 201 and the communication device 202 may be connected to each other. For example, the first converter circuit 634 of the electronic device 201 and the second converter circuit 680 of the communication device 202 may be connected by power lines. A second power line connected to an input terminal of the second converter circuit 680 may be electrically connected to a first power line connected to an output terminal of the first converter circuit 634. As another example, a signal line (e.g., control signal line) for transmitting and/or receiving a control signal may be connected to a bus line (e.g., bus line) for transmitting and/or receiving data. A signal line connected to the first processor 610 of the electronic device 201 and a signal line connected to the second processor 650 of the communication device 202 may be electrically connected to each other. In addition, a signal line of the first processor 610 of the electronic device 201 and a signal line of other components (e.g., the second converter circuit 680) of the communication device 202 may be electrically connected to each other.

In another example, the ground 641 of the electronic device 201 and the ground 642 (e.g., the ground 470 formed inside the second substrate 410 of FIG. 4B) of the communication device 202 may be connected to each other. As described above, when the lower ground pads 425 of the second substrate 410 of the communication device 202 are connected to the ground pad 371 of the fastening structure of the first substrate 310 of the electronic device 201, the ground 641 of the electronic device 201 and the ground 642 of the communication device 202 may be electrically connected to each other as shown in FIG. 6. When the grounds (e.g., 641) of the electronic device 201 and the grounds 642 of the communication device 202 are electrically connected to each other, the ground of the components of the communication device 202 may be secured.

Hereinafter, an example of a circuit component of the electronic device 201 and a circuit component of the communication device 202 will be described with reference to FIG. 6.

An example of a circuit component of the electronic device 201 will be described first.

According to various embodiments, referring to FIG. 6, the electronic device 201 may include a first processor 610, a communication module 620 (e.g., the second communication device 203 of FIG. 2), interface circuits 621, 622, and 623 for connection to a plurality of devices (e.g., an input device, such as a speaker, a display, a mouse, and a keyboard), a plurality of memories 631, 632, and 633, a first converter circuit 634, and a ground 641.

According to various embodiments, the first processor 610 of the electronic device 201 may transmit a control signal to components (e.g., the second converter circuit 680) of the electrically connected communication device 202. The first processor 610 is not limited to that shown in FIG. 6, and may transmit a control signal to other components (e.g., the second processor 650 of the communication device 202) other than the second converter circuit 680 of the communication device 202, and thus an operation of transmitting, by the first processor 610, a control signal to the second converter circuit 680 of the first communication device 202 may also be applied correspondingly to an operation of transmitting, by the first processor 610, a control signal to other components (e.g., the second processor 650 of the communication device 202) of the first communication device 202. Since the first processor 610 may be implemented as in the processor 320 of FIG. 3, a redundant description will be omitted.

According to various embodiments, the communication module 620 (e.g., the second communication device 203 of FIG. 2) may support establishment of a direct (e.g., wired) communication channel or wireless communication channel between the electronic device 201 and the external electronic device 201 and support communication therebetween through the established communication channel. The communication module 620 may support a communication scheme different from that of the first communication device 202. For example, when the communication device 202 supports 5G communication, the communication module of the electronic device 201 may support network communication, such as PAN or WAN. Since the communication module 620 may be implemented as in the communication module 190 of FIG. 1, a redundant description will be omitted.

According to various embodiments, the interface circuits 621, 622, and 623 may include a connection component, such as a connector for connection to an input device, such as a speaker, a display, a mouse, and a keyboard.

According to various embodiments, the plurality of memories 631, 632, and 633 may include a read-only memory (ROM) (ROM #1) 631 that stores an operating system (OS) for driving the electronic device 201, a ROM (ROM #2) 632 including an additional information storage region, and a random access memory (RAM) 633 that stores data for hosting a web site, data related to a program or an application (e.g., web applications), a full code, and/or state/context information. An operating system stored in the ROM of the first communication device 202 may be different from an operating system stored in the ROM of the electronic device 201. For example, the OS of the first communication device may be a Linux-based OS (e.g., Android OS), and the OS of the electronic device may be an OS (e.g., Windows-based operating system) different from the OS of the first communication device. In another example, the OS of the first communication device may be a mobile operating system, and the operating system of the electronic device may be a PC operating system. Without being limited to the above description, the OS of the first communication device and the OS of the electronic device may also be implemented to correspond (or be identical to) to each other. Since the memories 631, 632, and 633 may be implemented as in a well-known technology, other detailed descriptions thereof will be omitted. As will be described later, specific memories of the plurality of memories included in the electronic device 201 may include a region (e.g., hibernation region) in which information related to the first communication device 202 may be stored. An operation of storing, by the electronic device 201, information related to the first communication device 202 will be described later with reference to FIGS. 7 and 8.

According to various embodiments, the first converter circuit 634 may be a converter circuit that converts (e.g., step-down or boost) direct current (DC) power and transmits the converted DC power to other components of the electronic device 201. For example, the first converter circuit 634 may convert power acquired from a battery (e.g., 330 of FIG. 3) and transmit the converted power to other components (e.g., the first processor 610) of the electronic device 201. In another example, the first converter circuit 634 may transmit converted power to components (e.g., the second converter circuit 680) of the electrically connected communication device 202. Without being limited thereto, the first converter circuit 634 may also transmit converted power to other components (e.g., the second processor 650 of the communication device 202) other than the second converter circuit 680 of the communication device 202. The first converter circuit 634 may be a DC/DC converter circuit including a boost converter, a buck converter, a step-down converter, a step-down converter, a boost converter, a step-up converter, a step-down/boost converter, a buck-boost converter, a negative voltage converter, an invert converter, or an invert converter. Alternatively, without being limited thereto, the first converter circuit 634 may also be a DC/alternating current (AC) converter circuit or an AC/DC converter circuit.

According to various embodiments of the disclosure, the ground 641 may be electrically connected to at least one of the circuit components of the electronic device 201 to be a common ground when the electrical operations of the circuit components are performed. Referring to FIG. 6, the ground may be electrically connected to the ground pad 371 of the slot 360 disposed in the first substrate 310, as described above.

Hereinafter, an example of the circuit component of the communication device 202 will be described.

According to various embodiments, referring to FIG. 6, the communication device 202 may include a second processor 650, a transceiver 660, a plurality of memories 671 and 672, a second converter circuit 680, and a ground 642 (e.g., 740 of FIG. 4B).

According to various embodiments, the second processor 650 of the communication device 202 may generally control components of the communication device 202. Since the second processor 650 of the communication device 202 may be implemented as in the first processor 610 of the electronic device 201 described above, a redundant description thereof will be omitted. The second processor 650 of the communication device 202 may be a modem processor. The second processor 650 may include a storage circuit (e.g., register or memory) for storing information (e.g., stack frame information, program counter) related to an operation (e.g., data transmission (or transferring) and/or reception) being performed by the communication device 202. The register may include data registers for storing an integer data value, an address register for storing a memory device address used for accessing a memory device, a general purpose register capable of storing both the data value and the memory device address, a floating-point register for storing a floating-point data value, a constant register for storing a fixed data value, such as 0 or 1, a register (e.g. program counter or state counter) for storing the state of a running program, a command register for storing an instruction being currently executed. The electronic device 201 may back up information stored in the register of the second processor 650 of the communication device 202, which will be described later with reference to FIGS. 12 to 14.

According to various embodiments, the transceiver 660 may transmit and/or receive a communication signal, based on a communication scheme supported by the communication device 202. The transceiver 660 may include a plurality of antennas. Since the description of the plurality of antennas is the same as those described above, a redundant description will be omitted.

According to various embodiments, the plurality of memories 671 and 672 may include a read-only memory (ROM) (ROM #1) 671 that stores an operating system (OS) for driving the communication device 202, and a random access memory (RAM) 672 that stores data for hosting a web site, data related to a program or an application (e.g., web applications), a full code, and/or state/context information. Since the memories 671 and 672 may be implemented as in a well-known technology, other detailed descriptions thereof will be omitted. When a booting operation is completed, an operating system (e.g., Android OS (or RTOS)), various drivers, libraries, frameworks, programs, such as applications, or instructions may be implemented and/or driven in the RAM among the plurality of memories 671 and 672. After the booting is completed, information (e.g., information related to a base station, information stored in the kernel or framework when communication is performed, application activity information, information related to an operation being performed by communication software) related to an operation (e.g., performing communication) currently performed by the first communication device 202 may be generated, updated, and/or stored in the RAM. The electronic device 201 may back up the information stored in the RAM of the communication device 202, which will be further described later with reference to FIGS. 12 to 14.

According to various embodiments, the second converter circuit 680 may convert (e.g., step-down or boost) DC power to transmit the converted DC power to other components of the communication device 202. For example, an input terminal of the second converter circuit 680 may be electrically connected to the first converter circuit 634 of the electronic device 201 and the second converter circuit 680 may convert power transmitted from the first converter circuit 634 to transmit the converted power to other components (e.g., the second processor 650) of communication device 202. The second converter circuit 680 may be a DC/DC converter circuit as in the first converter circuit 634. Alternatively, without being limited thereto, the second converter circuit 680 may also be a DC/AC converter circuit or an AC/DC converter circuit.

Hereinafter, examples of operations of the electronic device 201 and the first communication device 202 according to various embodiments will be described.

According to various embodiments, the electronic device 201 may control the state (e.g., awake state (or mode) or a sleep state (or mode)) of the first communication device 202. The awake state may be defined as a state in which the first communication device 202 is driven due to the power transmitted from the electronic device 201 to the first communication device 202, and the sleep state may be defined as a state in which the first communication device 202 is not driven because transferring of power from the electronic device 201 to the first communication device 202 is suppressed. When the state of the first communication device 202 is switched from the awake state to the sleep state, the electronic device 201 may back up information related to the first communication device 202, and when the state of the first communication device 202 is switched from the sleep state to the awake state, the backup information may be transmitted to the first communication device 202, thereby shortening the booting time of the first communication device 202.

Figure 7:
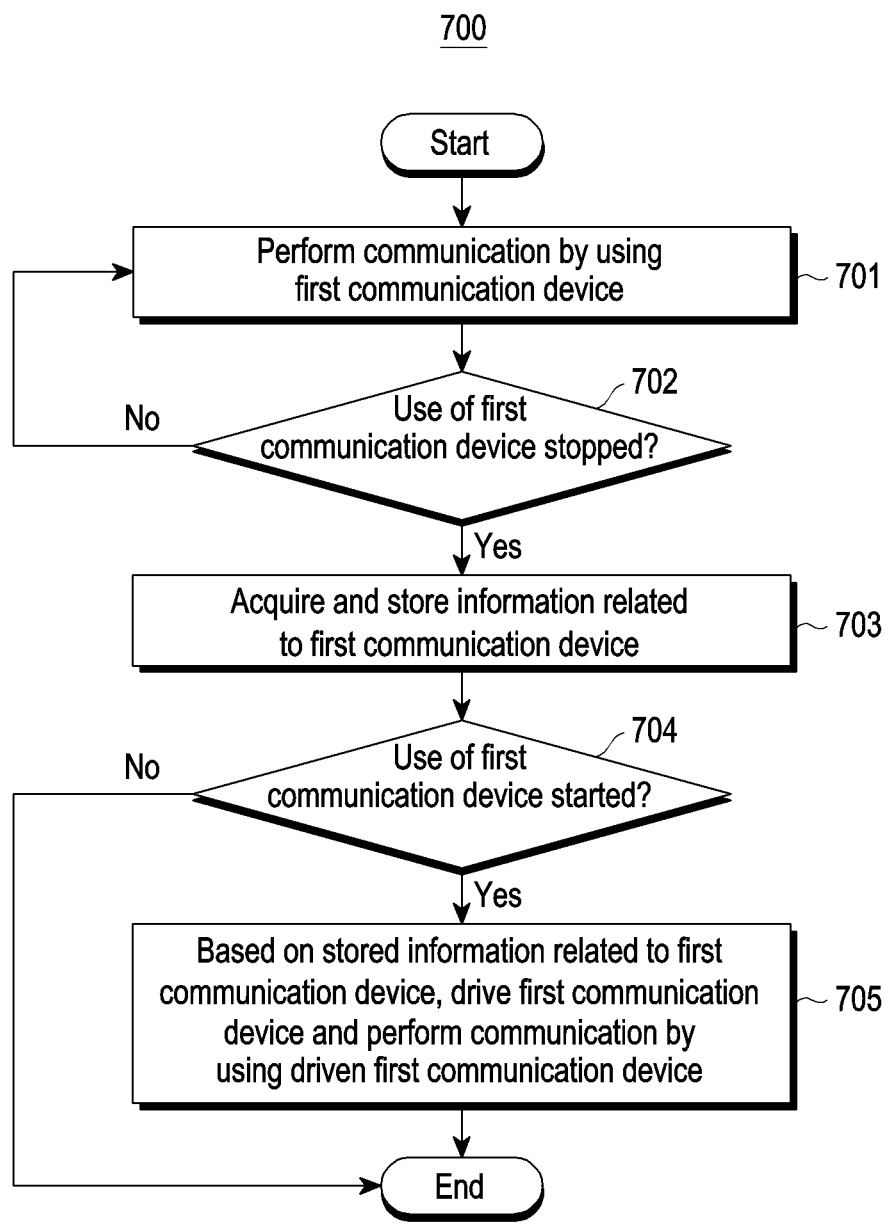
FIG. 7 is a flowchart illustrating an example of an operation of an electronic device according to various embodiments.

FIG. 7 is a flowchart 700 for showing an example of an operation of an electronic device according to various embodiments.

According to various embodiments, the operations shown in FIG. 7 are not limited to the order as shown, and may be performed in various orders. In addition, according to various embodiments, more operations than those shown in FIG. 7 may be performed or fewer than those shown in FIG. 7 or at least one operation may also be performed. Hereinafter, FIG. 7 will be described with reference to FIG. 8.

Figure 8:
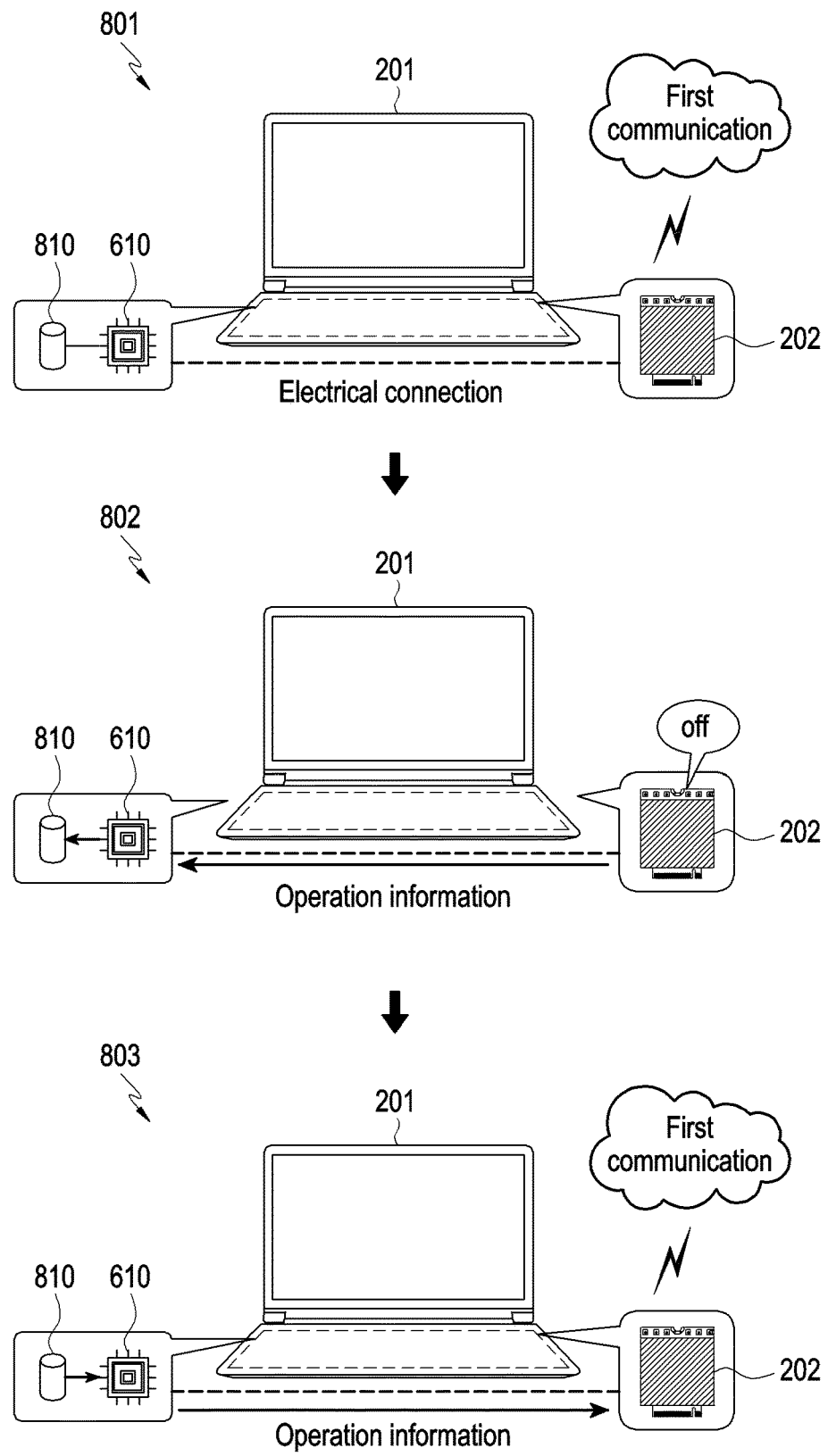
FIG. 8 illustrates an example of an operation of backing up and loading information related to an insertable communication device (e.g., first communication device) by an electronic device according to various embodiments.

FIG. 8 illustrates an example of an operation of backing up and loading information related to an insertable communication device (e.g., first communication device) by an electronic device according to various embodiments.

According to various embodiments, the electronic device 201 may perform communication using the first communication device 202 in operation 701. For example, in the case where the electronic device 201 is electrically connected to the first communication device 202 through the connector (e.g., 503 of FIG. 5) of the above-described electronic device 201 when the first communication device 202 is inserted thereinto, the electronic device 201 may identify the electrical connection to the first communication device 202. When the occurrence (e.g., receive a user input for use of the communication method (or communication scheme) supported by the first communication device 202) of an event for use of the first communication device 202 is identified, the electronic device 201 may perform control such that power is transmitted to the first communication device 202, based on (or via) the electrical connection (e.g., through a connector and a contact part of the first communication device 202). For example, the electronic device 201 (e.g., the first processor 610) may perform control such that the first converter circuit 634 (e.g., 634 of FIG. 6) transmits power to the first communication device 202 (e.g., the second converter circuit 680) (e.g., 680 of FIG. 6). The state of the first communication device 202 may be switched to the awake state (e.g., a state in which the first communication device 202 is driven), based on power reception. The first communication device 202 may perform a booting operation, based on the received power and may be driven based on the booting operation. The booting operation of the first communication device 202 may be an operation of starting up or initially setting a system (e.g., file system and OS of the first communication device 202 implemented independently of the electronic device 201) of the first communication device 202 so that the first communication device 202 can operate (e.g., communicate with a network). In another example, the booting operation may include loading a kernel, executing a framework, and starting up an operating system so that the first communication device 202 can operate (e.g., communicate with a network). The booting operation of the first communication device 202 may include a plurality of operations, which will be described later with reference to FIG. 11.

Referring to 801 of FIG. 8, the electronic device 201 may transmit (e.g., up-link) data to a network (e.g., base station) or receive (e.g., down-link) data from a network (e.g. base station), based on the first communication scheme (or communication scheme) (e.g., 5G communication) supported by the first communication device 202, by using the driven first communication device 202. In this case, the first communication device 202 may store and/or acquire information (operation information) related to the operation (or communication operation) of transmitting and/or receiving the data, currently being performed by the first communication device 202, information (state information) indicating a state during the operation of the first communication device 202, and/or information (task information) indicating a task during the operation of the first communication device 202. All the operation information may be information indicating an operation (or state) of transmitting and/or receiving the data, currently being performed by the first communication device 202. For example, the information associated with the operation may contain information (e.g., information in the registry described above) associated with the second processor (e.g., 650 of FIG. 6), and information (e.g., information for communication) associated with a memory (e.g., RAM) of the first communication device 202. Information associated with the second processor 650 of the first communication device 202 and information associated with the memory of the first communication device 202 will be further described later with reference to FIGS. 12 to 14.

According to various embodiments, in operation 702, the electronic device 201 may identify whether use of the first communication device 202 is stopped, and when the cessation of the use of the first communication device 202 is identified, the electronic device 201 may acquire and store the state information associated with the first communication device 202 in operation 703. For example, as shown in 802 of FIG. 8, the electronic device 201 may identify occurrence of a first event preconfigured to stop the use the first communication device 202. The first event may include an event for turning off the first communication device 202, an event in which the first communication (e.g., 5G communication) supported by the first communication device 202 is unavailable, and/or an event in which an error or defect of the first communication device 202 occurs. Without being limited thereto, the first event may include various types of events related to a situation in which use of the first communication device 202 is stopped and/or is unavailable.

As shown in 802 of FIG. 8, the electronic device 201 may turn off (or switch the state of the first communication device 202 from the awake state to the sleep state) the first communication device 202, based on the occurrence of the first event. For example, the electronic device 201 may control (e.g., perform control such that first converter circuit 634 refrains from transferring power to the second converter circuit 680 of the first communication device 202) such that transmission of power to be transmitted to the first communication device 202 is suppressed).

According to various embodiments, before the first communication device 202 is turned off, the electronic device 201 may back up operation information (or state information) associated with the first communication device 202, based on an electrical connection to the first communication device 202, as shown in 802 of FIG. 8. The electronic device 201 (e.g., the first processor 610) may receive information (operation information) (or state information) associated with an operation (e.g., communication operation) being performed by the first communication device 202 immediately before the first communication device 202 is turned off. The electronic device 201 (e.g., the first processor 610) may store the received operation information (or state information or operation information) in one memory 810 among the plurality of memories, as illustrated in 802 of FIG. 8. The one memory 810, which is a ROM, may include a region (e.g., hibernation region) preconfigured to store information related to the first communication device 202.

In operation 702, when the halting of the use of the first communication device 202 is not identified (i.e., when the maintenance of the use of the first communication device 202 is identified), the electronic device 201 may continue to maintain the use of the first communication device 202.

According to various embodiments, the electronic device 201 may identify in operation 704 whether use of the first communication device 202 is started, and when the start of the use of the first communication device 202 is identified, the electronic device 201 may drive the first communication device 202, based on stored information associated with the first communication device 202 and may perform communication by using the driven first communication device 202, in operation 705. For example, the electronic device 201 may identify occurrence of a second event preconfigured to start the use of the first communication device 202. The second event may include an event for turning on the first communication device 202, an event in which use of the first communication (e.g., 5G communication) supported by the first communication device 202 is re-enabled, and/or an event in which an error or defect of the first communication device 202 is repaired or restored. Without being limited thereto, the second event may include various types of events related to a situation in which the use of the first communication device 202 is to be started and/or needs to be started. The electronic device 201 may turn on (or switch the state of the first communication device 202 from the sleep state to the awake state) the first communication device 202, based on the occurrence of the second event, as shown in 803 of FIG. 8. For example, the electronic device 201 may transmit power to the first communication device 202 and transmit operation information (or state information or task information) stored in the memory 810 to the first communication device 202. The first communication device 202 may perform and drive only a part of a preconfigured booting operation, based on the received power and the operation information. The driven first communication device 202 may resume the operation being performed before the first communication device 202 is turned off (or may restore the state of the first communication device 202 before turn-off). The electronic device 201 may perform the first communication using the driven first communication device 202.

When the start of the use of the first communication device 202 is not identified in operation 704, the electronic device 201 may not continue to use the first communication device 202.

Hereinafter, examples of operations of the electronic device 201 and the first communication device 202 according to various embodiments will be described.

According to various embodiments, when the state of one communication device (e.g., the first communication device 202) including an operating system (OS) implemented separately from the electronic device 201, among a plurality of communication devices, is switched to the sleep state, the electronic device 201 may control the state of another communication device (e.g., the second communication device 203) to the awake state and may perform communication by the another communication device in the awake state. In this case, the electronic device 201 may back up information (e.g., information on the second processor and information on RAM) related to the one communication device (e.g., the first communication device 202) switched to the sleep state, and then, when the state of the one communication device (e.g., the first communication device 202) is switched to the awake state, may perform only a part of the booting operation of the one communication device (e.g., the first communication device 202) by using the backed-up information to restore the operation of the one communication device (e.g., the first communication device 202), performed before the state of the one communication device (e.g., the first communication device 202) is switched to the sleep state.

Figure 9:
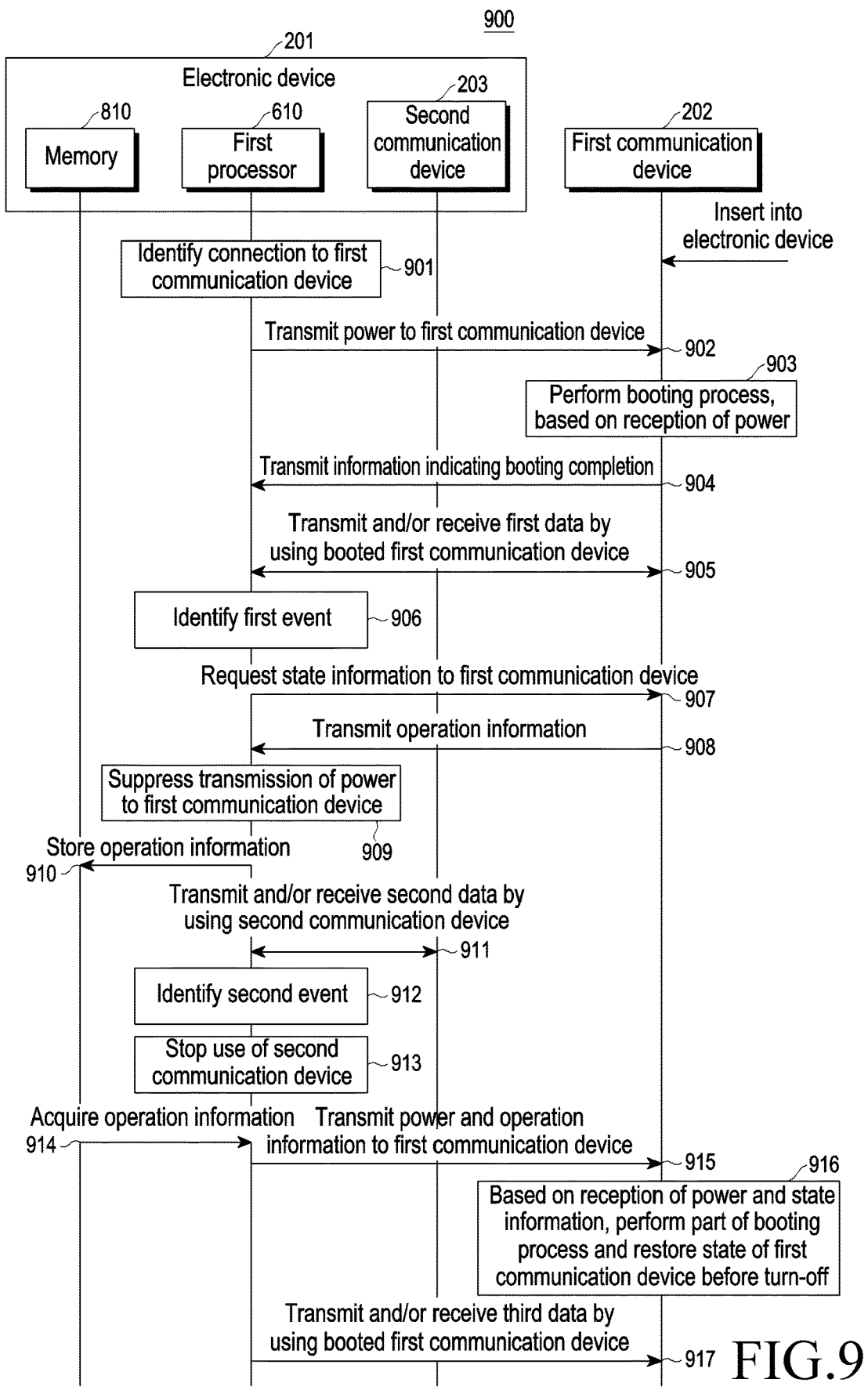
FIG. 9 is a flowchart illustrating an example of an operation of an electronic device according to various embodiments.

FIG. 9 is a flowchart 900 for showing an example of an operation of an electronic device according to various embodiments.

According to various embodiments, the operations shown in FIG. 9 are not limited to the order as shown and may be performed in various orders. In addition, according to various embodiments, more operations than those shown in FIG. 9 may be performed or fewer than those shown in FIG. 9 or at least one operation may also be performed. Hereinafter, FIG. 9 will be described with reference to FIGS. 10 and 11.

Figure 10:
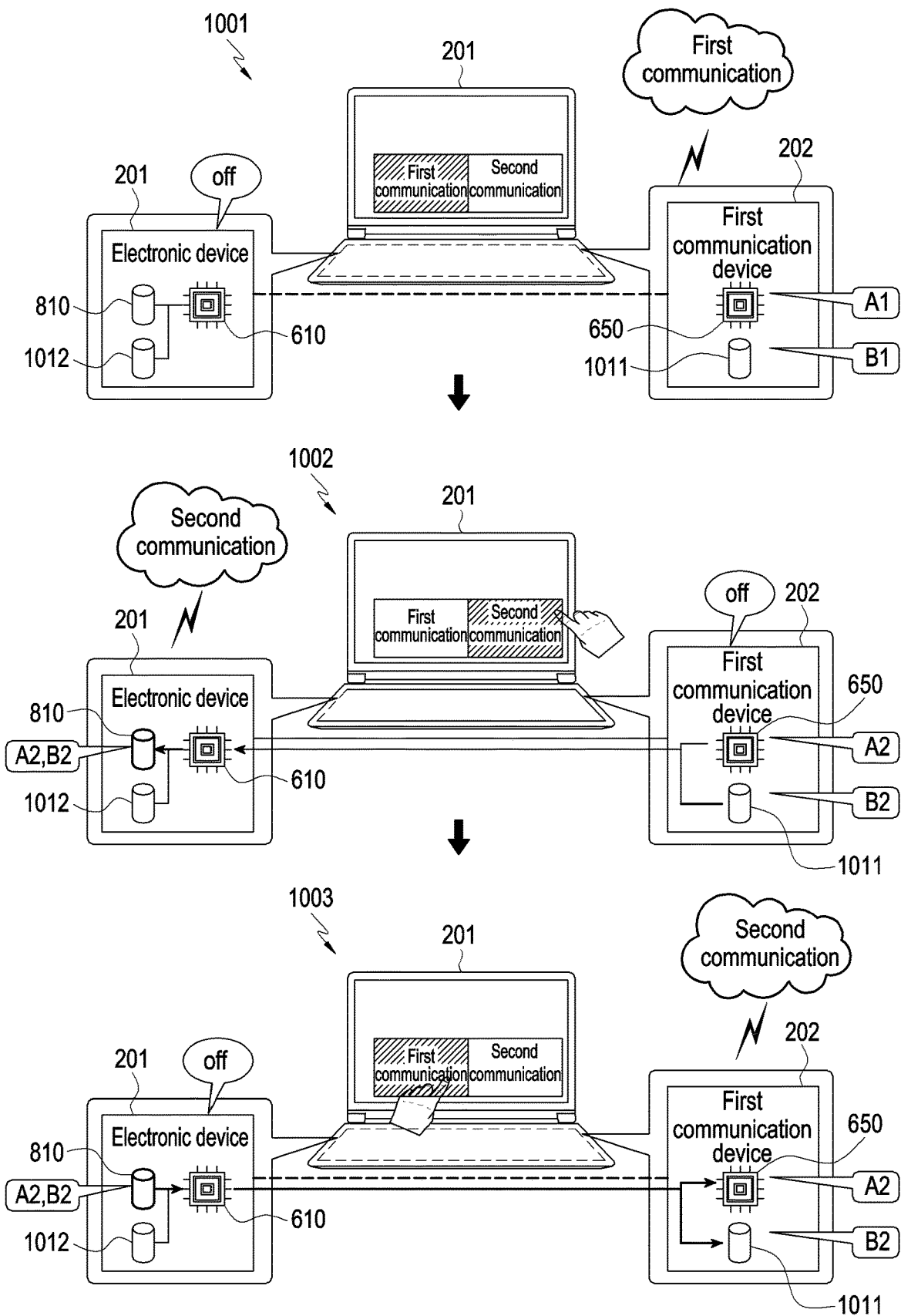
FIG. 10 is an example of an operation of performing communication by an electronic device using an insertable communication device (e.g., first communication device) and a communication device (e.g., second communication device) embedded in the electronic device, according to various embodiments.
Figure 11:
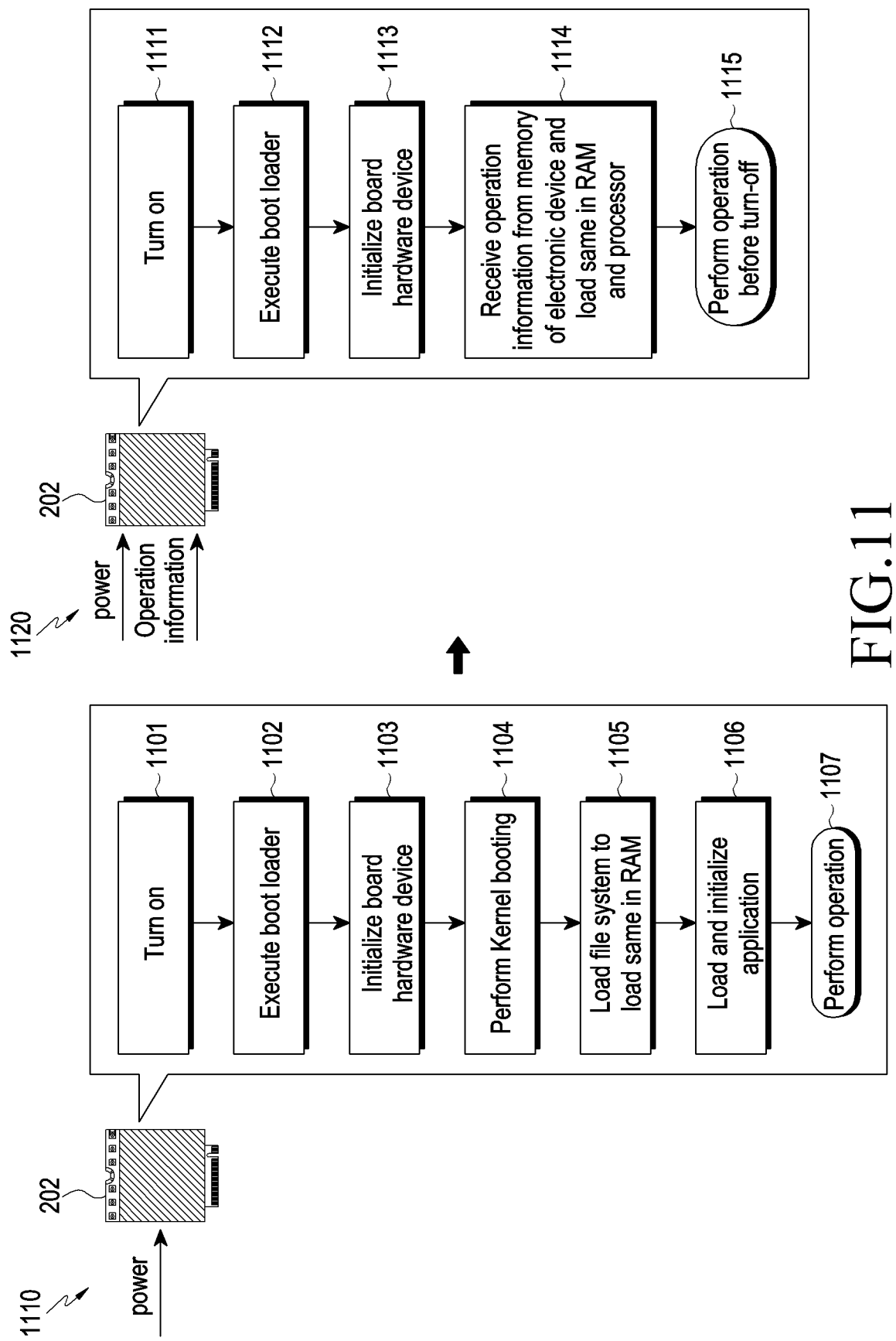
FIG. 11 illustrates an example of a booting operation of a first communication device according to various embodiments.

FIG. 10 illustrates an example of an operation of performing communication by an electronic device using an insertable communication device (e.g., first communication device) and a communication device (e.g., second communication device) embedded in the electronic device according to various embodiments. FIG. 11 illustrates an example of a booting operation of a first communication device according to various embodiments.

Referring to FIGS. 10 and 11, according to various embodiments, the electronic device 201 (e.g., the first processor 610) may identify the connection to the first communication device 202 in operation 901 and may perform control such that power is transmitted to the first communication device 202 in operation 902. For example, in the case where the electronic device 201 is electrically connected to the first communication device 202 through the connector (e.g., 503 of FIG. 5) of the above-described electronic device 201 when the first communication device 202 is inserted thereinto, the electronic device 201 may identify the electrical connection to the first communication device 202. The electronic device 201 may control based on the electrical connection such that the first converter circuit (e.g., 634 in FIG. 6) transmits power to the first communication device 202 (e.g., second converter circuit (e.g., 680 in FIG. 6))). Accordingly, the state of the first communication device 202 may be switched to the awake state.

According to various embodiments, the first communication device 202 may perform a booting operation in operation 903, based on power reception, and when the booting operation is completed, may transmit information indicating booting completion to the electronic device 201 (e.g., the processor) in operation 904. For example, based on the received power, the first communication device 202 may perform a booting operation for starting up or initially setting up a system (e.g., file system and operating system (OS) of the first communication device 202, implemented independently of the electronic device 201) of the first communication device 202 such that the first communication device 202 can operate (e.g. perform communication with a network). Hereinafter, examples of the booting operation of the first communication device 202 will be described with reference to FIG. 11.

According to various embodiments, referring to 1110 of FIG. 11, the first communication device 202 may be turned on first (1101). The first communication device 202 may convert the power received from the electronic device 201 by using the second converter circuit, and transmit the converted power to the components (e.g., the second processor 650) of the first communication device 202. After the first communication device 202 is turned on, the first communication device may determine whether or not there exists an abnormality in the first communication device 202, such as an operation of testing the second processor 650 and a power on self-test (POST) operation, by initializing the second processor 650. The POST operation may include an operation of testing for abnormalities in the system bus and various components (e.g., memory, transceiver, and the like) included in the first communication device 202, based on basic input output system (BIOS) information. The codes or instructions for inducing the POST operation may be stored in the ROM of the first communication device 202, and when the codes or instructions are executed, the first communication device 202 may perform the power on self-test (POST) operation.

According to various embodiments, referring to 1110 of FIG. 11, the first communication device 202 may execute a boot loader (1102) stored in the ROM and perform initialization of a board hardware device (1103) when determined that the first communication device 202 has no abnormality. For example, the boot loader may be a program configured to perform a task for the normal operation of the kernel, performed before the operating system (OS) of the first communication device 202 is started up. As an example, the boot loader may include LILO, GRUB, Blob, and bootsector.S. The first communication device 202 may debug hardware components included in the first communication device 202, based on the execution of the boot loader, initialize the hardware components, and boot the operating system (e.g., Linux OS). In addition, the boot loader may load a kernel image, decompress the kernel, and then load the decompressed kernel in the memory 1011 (e.g., RAM) of the first communication device 201. The loaded kernel may be a kernel based on a specific OS (e.g., Linux).

According to various embodiments, referring to 1110 of FIG. 11, the first communication device 202 may boot the kernel (1104), load a file system to load the same in the memory 1011 (e.g., RAM) of the first communication device 201 (1105), and perform application loading and initialization (1106). For example, the first communication device 202 may mount the file system (load the file system to load the same in the memory 1011 (e.g., RAM) of the first communication device 201) when the booting operation of the loaded kernel is performed. The first communication device may execute an init process after mounting the file system. The first communication device 202 may execute programs (e.g., daemon, context manager, and the like) required for the operation of the framework, based on the execution of the init process. An application may be driven and initialized based on the execution of the programs of the first communication device.

According to various embodiments, a program for driving an operating system, code, or instructions may be implemented in the RAM of the booted first communication device 202. For example, a specific OS (e.g., Android OS (or RTOS)), various drivers, libraries, frameworks, and applications may be implemented in the memory 1011 (e.g., RAM) of the first communication device 201 of the booted first communication device 202. The programs, codes, or instructions implemented in the memory 1011 (e.g., RAM) of the booted first communication device 201 may be implemented as in a well-known technology, and thus a detailed description thereof will be omitted. The first communication device 202 may perform an operation (e.g., RRC connection to a specific base station) (1107), based on the programs, codes, or instructions implemented in the RAM.

According to various embodiments, the electronic device 201 may transmit and/or receive first data by using the booted first communication device 202 in operation 905. For example, the electronic device 201 may perform at least one operation (e.g., communicate with a network (e.g., base station), based on communication (e.g., 5G communication) supported by the first communication device 202) by using the driven first communication device 202, as shown in 1001 of FIG. 10. In this case, the first communication device 202 may perform at least one operation (e.g., the communication) and acquire operation information (state information or task information) related to the performed operation (e.g., communication). For example, when the first communication device 202 performs the communication, information (e.g., A1, B1) according to the execution and/or the driving of a program (e.g., operating system, file system, and app or program for performing communication) for performing communication on the second processor 650 of the first communication device 202 and the memory 1011 (e.g., RAM) of the first communication device 202 may be generated (and/or updated) in the memory 1011 (e.g., RAM) of the first communication device 201 and the second processor 650. For example, the electronic device 201 may execute a web program, may access another external electronic device (e.g., web server) through a network (e.g., base station) by using the first communication device 202, based on the executed web program, and may receive information (or data) (e.g., web information) from another accessed external electronic device. The program of the first communication device 202 is driven when the electronic device 201 uses the first communication device 202 (e.g., use for access to an external electronic device, based on the executed web program), and the first communication device 202 may store information (e.g., A1, B1) generated and/or updated according to the driving of the program in the second processor 650 (e.g., register) or the memory 1011 (e.g., RAM) of the first communication device 201. In other words, each of the pieces of information (e.g., A1, B1) may indicate an operation (e.g., communication) currently performed by the first communication device 202. According to the operation of the first communication device 202, information generated and/or updated in the memory 1011 (e.g., RAM) of the first communication device 201 and the second processor 650 will be described later with reference to FIGS. 12 to 14.

According to various embodiments, the electronic device 201 (e.g., the first processor 610) may identify occurrence of a first event in operation 906 and request operation information to the first communication device 202 in operation 907. For example, the electronic device 201 may identify occurrence of an event (e.g., first event) configured to stop the use of the first communication device 202 while performing at least one operation (e.g., communication) by using the first communication device 202, and may request the operation information (or state information) of the first communication device 202 described above to the first communication device 202, based on the occurrence of the identified first event. As described above, the first event may include an event for turning off the first communication device 202, an event in which first communication (e.g., 5G communication) supported by the first communication device 202 is unavailable, and/or an event in which an error or defect of the first communication device 202 occurs. For example, when the at least one operation (e.g., communication) of the first communication device 202 is performed, information (e.g., A2, B2) may be generated and/or updated in the second processor 650 and the RAM of the first communication device 202, respectively, as described above. Before transmission(or transferring) of power to the first communication device 202 is suppressed based on the occurrence of the first event, the electronic device 201 may request currently generated and/or updated information (e.g., A2, B2) to the first communication device 202 (e.g., the second processor 650). Information generated and/or updated in the memory 1011 (e.g., RAM) of the first communication device 202 and the second processor 650 according to the operation of the first communication device 202 will be described later with FIGS. 12 to 14.

According to various embodiments, the first communication device 202 may transmit operation information (or state information) to the electronic device 201 in operation 908, and the electronic device 201 may store the received operation information (or state information) in the memory 810 in operation 909. For example, as shown in 1002 of FIG. 10, the electronic device 201 may receive, from the second processor 650 (e.g. register) of the first communication device 202 and the memory 1011 (e.g., RAM) of the first communication device 202, information (e.g., A2, B2) respectively stored therein, based on the electrical connection to the first communication device 202. Each of the pieces of information (e.g., A2, B2) may indicate an operation (e.g., communication) performed by the first communication device 202 immediately before transmission of power to the first communication device 202 is suppressed. The electronic device 201 may store the received information (e.g., A2, B2) in a specific memory 810 among the plurality of memories (e.g., 810 and 1012). The specific memory 810 may be a non-volatile memory (e.g., ROM) and may include a region (e.g., hibernation region) preconfigured to back up the information received from the first communication device 202.

According to various embodiments, the electronic device 201 may identify a state of information stored in a preconfigured region (e.g., hibernation region) of the specific memory 810, and may store information (e.g., A2, B2) received from the first communication device 202, based on a result of the identification. For example, a preconfigured region (e.g., hibernation region) of the specific memory 810 may be configured to store information of a specified size. Before the information (e.g., A2, B2) received from the first communication device 202 is stored, the electronic device 201 may store other information (hereinafter, referred to as previous information) received from the first communication device 202 in at least a part of the preconfigured region. The electronic device 201 may identify a size of the previous information stored in the at least a part of the preconfigured region, and may identify (or calculate) the difference between the identified size of the previous information and the size of designated information configured to be stored in the preconfigured region (e.g., hibernation region). When the size of the information (e.g., A2, B2) received from the first communication device 202 is smaller than the identified difference, the electronic device 201 may store the received information (e.g., A2, B2) in the remaining region of the preconfigured region. When the size of the information (e.g., A2, B2) received from the first communication device 202 is larger than the identified difference, the electronic device 201 may delete the previous information stored in a preconfigured region to store the received information (e.g., A2, B2) or may overwritten the received information (e.g., A2, B2) on previous information stored in the preconfigured region. When the size of the information (e.g., A2, B2) received from the first communication device 202 is larger than the identified difference, the electronic device 201 may also newly configure a hibernation region in another memory 1012 and store the received information (e.g., A2, B2) in the newly configured hibernation region.

According to various embodiments, the electronic device 201 may control in operation 910 such that transmission of power to the first communication device 202 is suppressed. For example, in response to receiving and/or storing information (e.g., A2, B2) from the first communication device 202, the electronic device 201 may perform control such that the first converter circuit 634 refrain from an operation of transmitting power to the first communication device 202 (e.g., the second converter circuit 680). The first communication device 202 may be turned off when the transmission of power is suppressed, and the mode of the first communication device 202 may be switched from an awake mode to a sleep mode.

According to various embodiments, the electronic device 201 may transmit and/or receive second data by using the second communication device 203 in operation 911. For example, the electronic device 201 may perform communication, based on a second communication scheme (e.g., PAN/WLAN) supported by the second communication device 203 embedded in the electronic device 201. For example, the electronic device 201 may maintain a connection to another external electronic device (e.g., server) using a web application, based on the second communication scheme supported by the second communication device 203. The electronic device 201 may transmit data to another external electronic device and/or receive data from the another external electronic device by performing communication, based on the second communication scheme.

According to various embodiments, the electronic device 201 may identify occurrence of a second event in operation 912 and may stop using the second communication device 203 in operation 913. For example, the electronic device 201 may identify occurrence of an event (e.g., second event) configured to stop the use of the second communication device 203 while performing at least one operation (e.g., communication) using the second communication device 203, and may stop using the second communication device 203 (e.g., switch the state of the second communication device 203 to the sleep mode), based on the occurrence of the identified second event. The second event may include an event for turning on the first communication device 202, an event in which the use of the first communication (e.g., 5G communication) supported by the first communication device 202 is re-enabled, and/or an event in which the error or defect of the first communication device 202 is repaired or restored.

According to various embodiments, the electronic device 201 may acquire operation information stored in the memory (e.g., ROM) in operation 914. In operation 915, the electronic device may perform control such that power is transmitted to the first communication device 202 and may transmit the operation information acquired from the memory to the first communication device 202. For example, the electronic device 201 may acquire (or read) information (e.g., A2, B2) stored in a designated region (e.g., hibernation region) of the specific memory 810 among the plurality of memories (e.g., 810 and 1012), based on the occurrence of the second event (e.g., an event configured to start the use of the first communication device 202). The electronic device 201 may identify first information (e.g., A2) associated with the second processor 650 and identify second information (e.g., B2) associated with the memory 810 (e.g., ROM) among the acquired pieces of information (e.g., A2, B2) stored in the designated region (e.g., hibernation region). The electronic device 201 may perform control such that the first converter circuit transmits power to the first communication device 202 (e.g., the second converter circuit). Thereafter, the electronic device 201 may transmits the identified first information (e.g., A2) to the second processor 650 of the first communication device 202 to restore (or load) the same and may transmit the identified second information (e.g., B2) to the memory 1011 of the first communication device 201 to restore (or load) the same. A time point at which the first information and the second information are restored may be a time point after the first communication device 202 loads a kernel in RAM, which will be described later. As described, the electronic device 201 may restore (load) the first information and the second information in the second processor 650 of the first communication device 202 and the memory 1011 of the first communication device 201, respectively, but as will be described later, the first communication device 202 (e.g., the second processor 650) may receive the first information and the second information and may restore (or load) the first information and the second information, received after load of the kernel, in the second processor 650 and the memory 1011 of the first communication device 201, respectively.

According to various embodiments, the electronic device 201 may transmit the operation information to the first communication device 202, based on satisfaction of a predetermined condition. In other words, when the predetermined condition is not satisfied, the electronic device 201 may refrain from an operation of transmitting the operation information to the first communication device 202. For example, the satisfaction of the predetermined condition may include satisfaction of a condition in which the time from when the use of the first communication device 202 is stopped to when the use of the first communication device 202 is resumed is within a predetermined time. For example, when the second event occurs, the electronic device 201 may calculate the time between the occurrence of the first event configured to stop the use of the first communication device 202 and the occurrence of the second event. When the calculated time is within the predetermined time, the electronic device 201 may transmit operation information to the first communication device 202 to restore the operation and/or the state of the first communication device 202.

Without being limited thereto, the satisfaction of the predetermined condition may include satisfaction of various conditions indicating that restoration of the operation and/or state of the first communication device 202 is required. As described above, since the electronic device 201 may determine whether to perform an operation of transmitting the operation information according to whether the predetermined condition is satisfied, the electronic device 201 may not perform the operation in a situation where restoration of the operation and/or state of the first communication device 202 is not required, thereby reducing the operational load of the electronic device 201.

According to various embodiments, in operation 916, the first communication device 202 may perform only a part of the booting operation, based on the received power and operation information (or state information), and may restore the previous operation (or previous state) of the first communication device 202. The first communication device 202 may perform a reduced booting operation, based on information (e.g., A2, B2) received (or restored) from the electronic device 201, as shown in 1120 of FIG. 11. The first communication device 202 may perform the turn-on (1111), the boot loader executing operation (1112), and the board hardware device initializing operation (1113) only among a plurality of operations for the booting operation and may refrain from the remaining operations. For example, the first communication device 202 (e.g., the second processor 650) may be turned on based on the power received from the electronic device 201, execute a boot loader, debug and initialize hardware components included in the first communication device 202, and finally load a kernel in the memory 1011 (e.g., RAM) of the first communication device 202. After the kernel is loaded, the first communication device 202 may load the first information (e.g., A2) received from the electronic device 201 into the first processor 610 and may load the second information (e.g., B2) in the memory 1011 (e.g., RAM) of the first communication device 202 (1114). Based on the load of the first information and the second information, the first communication device 202 may perform the operation (state or task) (or restore) performed before the first communication device 202 is turned off (1115) (or the state of the first communication device 202 is switched to the sleep state).

According to various embodiments, the electronic device 201 may transmit and/or receive third data in operation 917 by using the booted first communication device 202 and restored previous operation (previous state or the previous task). For example, as shown in 1003 of FIG. 10, the electronic device 201 may perform communication, based on the first communication scheme supported by the first communication device 202 while the second communication device 203 is turned off (or while the second communication device 203 is in the sleep state). Hereinafter, examples of operations of the electronic device 201 and the first communication device 202 according to various embodiments will be described.

According to various embodiments, the first communication device 202 may update information in the processor (e.g., the second processor) 650 and the memory (e.g., RAM) 1011 of the first communication device 202, respectively, when at least one operation is performed. The first communication device 202 may transmit information updated just before the first communication device 202 is turned off (last updated information), to the electronic device 201 so that the information is backed up in the electronic device 201.

Figure 12:
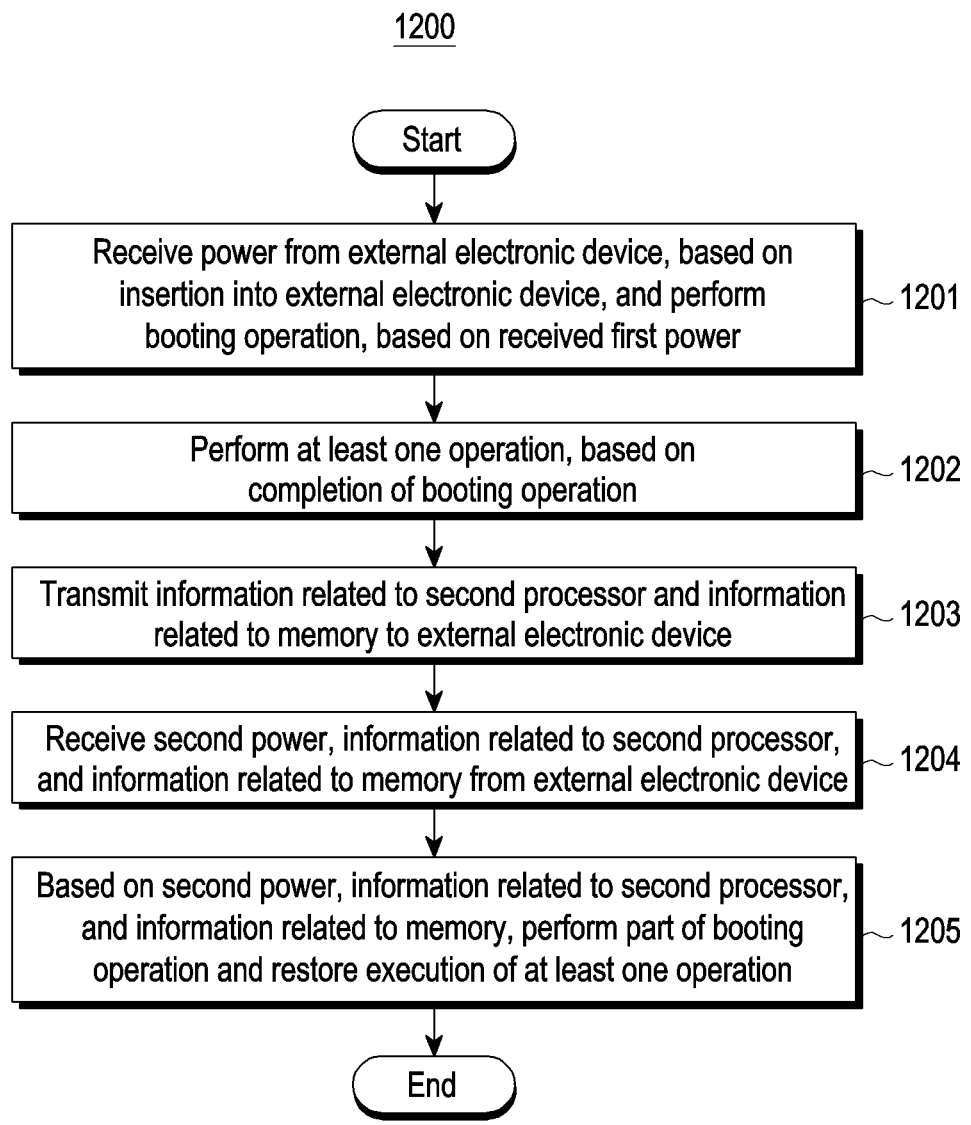
FIG. 12 is a flowchart illustrating an example of an operation of an electronic device according to various embodiments.

FIG. 12 is a flowchart 1200 for showing an example of an operation of an electronic device according to various embodiments.

According to various embodiments, the operations shown in FIG. 12 are not limited to the order as shown and may be performed in various orders. In addition, according to various embodiments, more operations than those shown in FIG. 12 may be performed or fewer than those shown in FIG. 12 or at least one operation may also be performed. Hereinafter, FIG. 12 will be described with reference to FIGS. 13 and 14.

Figure 13:
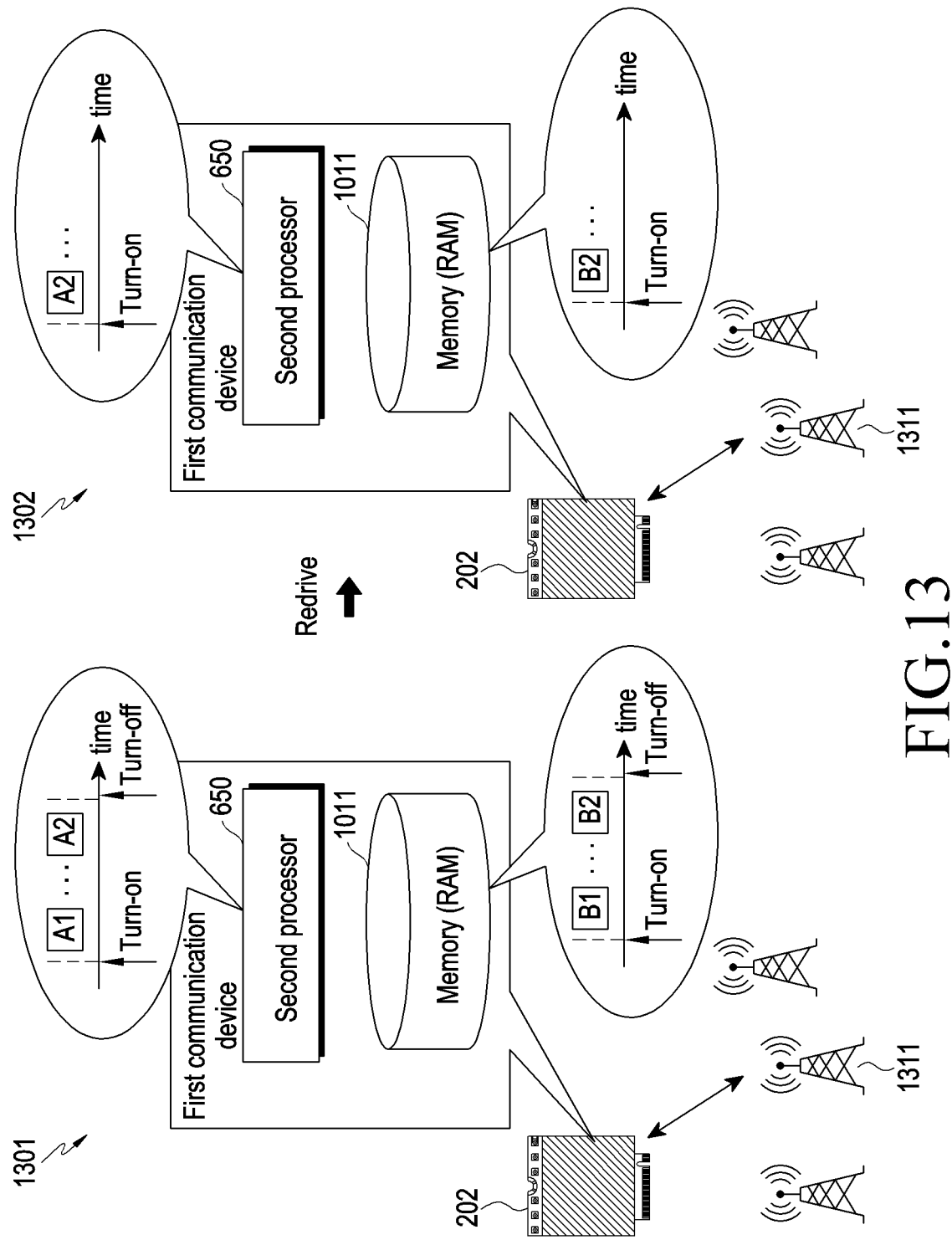
FIG. 13 illustrates an example of an operation of restoring a previous operation (previous state or previous work), based on information received from an electronic device of the first communication device according to various embodiments.
Figure 14:
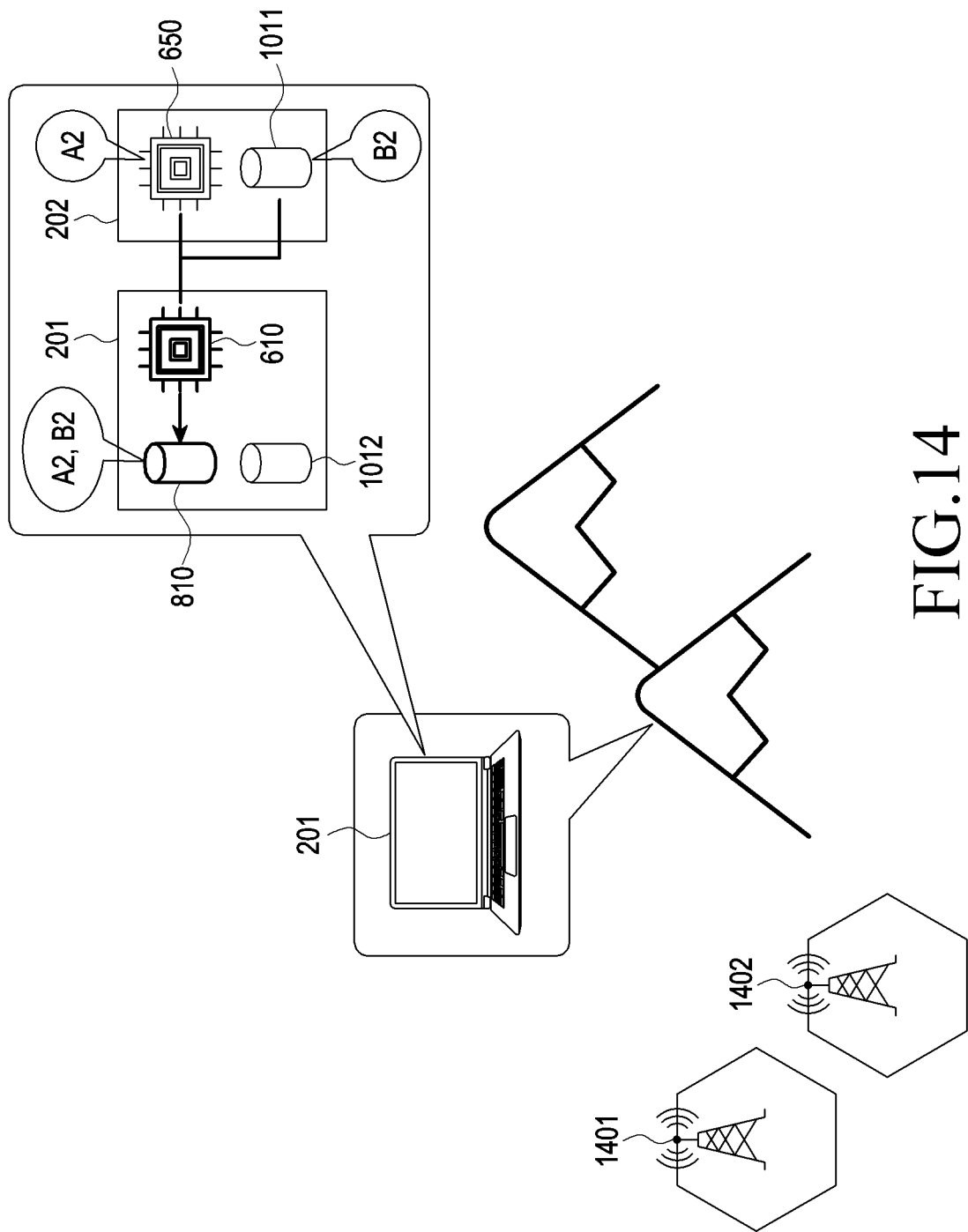
FIG. 14 illustrates an example in which a first communication device autonomously identifies a first event and transmits operation information to an electronic device, according to various embodiments.

FIG. 13 illustrates an example of an operation of restoring a previous operation (previous state or a previous task), based on information received from an electronic device of the first communication device according to various embodiments. FIG. 14 illustrates an example in which a first communication device autonomously identifies a first event and transmits operation information to an electronic device, according to various embodiments.

Referring to FIGS. 12, 13, and 14, according to various embodiments, in operation 1201, the first communication device 202 may receive first power from an external electronic device 201, based on insertion into the external electronic device 201, and may boot based on the received power. For example, the first communication device 202 may be electrically connected to the electronic device 201 through the connector (e.g., 503 of FIG. 5) of the electronic device 201 described above, according to the insertion of the first communication device 202. The first communication device 202 may receive power from the electronic device 201 (e.g., the first converter circuit 634) through the second converter circuit 680. The first communication device 202 may be turned on based on the received power and may perform a booting operation (e.g., 1110 of FIG. 11). Since the booting operation of the first communication device 202 may be performed as described in FIG. 11, a redundant description will be omitted.

According to various embodiments, in operation 1202, the first communication device 202 may perform at least one operation, based on completion of the boot operation. For example, the electronic device 201 may perform communication by using the first communication device 202. According to the use of the first communication device 202 of the electronic device 201, a program (e.g., operating system, file system, an app or a program for performing communication) may be driven and/or executed in the first communication device 202, and according to the driving and/or the execution of the first program, information may be sequentially generated and/or updated in the first communication device 202 (e.g., updated from A1 information to A2 information as shown in 1301 of FIG. 13), and the information may be generated and/or updated in the second processor 650 and the RAM (e.g., updated from B1 information to B2 information as shown in 1301 of FIG. 13). As an example, the first communication device 202 may perform a communication connection to a specific network (e.g., specific base station 1311 shown in 1301 or 1302 of FIG. 13) by using 5G communication, and according to the communication connection to the specific network, pieces of information may be generated and/or updated in the program and the memory (e.g., RAM) 1011. Hereinafter, information updated in the second processor 650 and the memory (e.g., RAM) 1011 of the first communication device 202 will be described.

According to various embodiments, the second processor 650 (e.g., register or memory) of the first communication device 202 may store information indicating the state of a currently driven program during the operation of the first communication device 202. For example, the second processor 650 (e.g., register or memory) may store information or cache which is stored in a register, such as a stack pointer, a link register, and a program counter, when an operation (e.g., communication with a specific base station 1311) of the current electronic device 201 (or the first communication device 202) is performed. Since other various types of registers and information stored therein are the same as those described in FIG. 6, a redundant description will be omitted. Information stored in the highest level of the second processor 650 (e.g., register or memory) may be updated in the second processor 650 of the first communication device 202 according to the electronic device 201 (or the first communication device 202), and as will be described later, the highest level of information (or the most recently generated and/or updated information) (e.g., A2) generated and/or updated at the turn-off time of the first communication device 202 may be provided to the electronic device 201.

According to various embodiments, the RAM of the first communication device 202 may store information (e.g., information for performing communication, information for maintaining the communication) for communication with a network (e.g., base station). After the booting of the first communication device 202 is completed, an operating system (e.g., Android OS (or RTOS)) of the first communication device 202, various drivers, libraries, frameworks, programs, such as applications, or instructions may be implemented and/or driven in the RAM of the first communication device 202. Since the programs or instructions may be driven according to communication with a network (e.g., base station 1311) of the first communication device 202, information for communication with the network may be frequently updated in the RAM. For example, the RAM may include information for communication with a specific network (e.g., specific base station 1311) (e.g., base station 1311 through which the first communication device 202 currently communicates). The information for communication with the specific network may include information on a location of the specific network and information on signal strength of communication with the current base station 1311. As will be described later, the information generated and/or updated in the RAM at the turn-off time of the first communication device 202 (or most recently generated and/or updated information) (e.g., B2) may be provided to the electronic device 201.

According to various embodiments, the first communication device 202 may transmit information related to the second processor 650 and information related to the memory (e.g., RAM) 1011 to the external electronic device 201 in operation 1203. For example, the external electronic device 201 may identify occurrence of a first event configured to stop the use of the first communication device 202 and may request operation information (e.g., information related to the second processor 650 and information related to the memory (e.g., RAM) 1011) of the first communication device 202 to the first communication device 202. Since the occurrence of the first event is the same as described above, a redundant description will be omitted. Based on the reception of the request, the first communication device 202 may transmit, to the electronic device 201, information (e.g., stack pointer, program counter) and information (e.g., information on a specific network) which are respectively stored in the second processor 650 and the memory (e.g., RAM) 1011 at the time of receiving the request. As described above, the information stored in the second processor 650 and the information stored in the memory (e.g., RAM) 1011 may be information generated and/or updated in the second processor 650 and the memory (e.g., RAM) 1011 when the first communication device 202 performs communication at a specific time point (e.g., a time point at which request is received or a time point before turn-off). The first communication device 202 may stop receiving power from the electronic device 201, based on the information transmitted to the electronic device 201. Accordingly, the first communication device 202 may be turned off, and the state of the first communication device 202 may be switched to the sleep state.

Without being limited thereto, according to various embodiments, the first communication device 202 may autonomously identify the occurrence of the first event and may also transmit information (e.g., information associated with the second processor 650 and information associated with the memory (e.g., RAM) 1011) to the electronic device 201, based on the identification of the occurrence of the first event. For example, the first communication device 202 may autonomously identify an event in which the first communication device 202 is unavailable, and may transmit information (e.g., information associated with the second processor 650 and information associated with the memory (e.g., RAM) 1011) to the electronic device 201, based on the identification of the event. For example, the event in which the first communication device 202 is unavailable may include an event occurring when the electronic device 201 (or the first communication device 202) is located at a location where communication cannot be performed. For example, referring to FIG. 14, the electronic device 201 may be located at a location where communication with a network (e.g., base stations 1401 and 1402) is unavailable while using communication supported by the first communication device 202. The first communication device 202 may identify information on signal strength with a network (e.g., base stations 1401 and 1402) or information on a location of a neighboring network (e.g., neighboring base station) stored in the RAM, and may identify that communication with the network is unavailable, based on the identified information. Based on the unavailable communication with the network, the first communication device 202 may transmit information (e.g., information related to the second processor 650 and information related to the memory (e.g., RAM) 1011) of the first communication device 202 to the electronic device 201 together with information indicating unavailability of the first communication device 202. Based on the received information indicating unavailability of the first communication device 202, the electronic device 201 may perform control such that transmission of power to the first communication device 202 is suppressed and may store the received information of the first communication device 202 in a specific memory (e.g., 810 of FIG. 8) among the plurality of memories (e.g., 810 and 1012).

According to various embodiments, the first communication device 202 may receive second power, information of the processor, and information of the memory from the external electronic device 201 in operation 1204, and in operation 1205, may perform only a part of the booting operation and restore execution of the at least one operation, based the second power, the information of the processor, and the information of the memory. For example, the external electronic device 201 may identify occurrence of a second event configured to start the use of the first communication device 202, and may transmit power and operation information (e.g., information associated with the second processor 650 and information associated with a memory (e.g., RAM) 1011) to the first communication device 202, based on the occurrence of the second event. As described above with reference to FIG. 11, the first communication device 202 may perform only a part of the booting operation, based on the received power and operation information, and may restore the previous operation. For example, as shown in 1302 of FIG. 13, based on the operation information received from the electronic device 201, the first communication device 202 may load information (e.g., A2) of the second processor 650 in the second processor 650 and load information (e.g., B2) of the memory (e.g., RAM) 1011 in the memory (e.g., RAM) 1011 before turned off, thereby restoring the previous (before turn-off) operation of the first communication device 202. As an example, as shown in FIG. 13, the first communication device 202 may restore the received information (e.g., stack pointer, program counter) associated with the second processor 650 in the second processor 650 and restore the information associated with the memory (e.g., RAM) 1011, thereby continually resuming communication with a specific network (e.g., specific base station 1311) with which the first communication device 202 has performed communication before turned off. In other words, the electronic device 201 may resume communication with a specific network with which the first communication device 202 has performed communication before turned off, by using the rebooted first communication device 202. In the case where a location of the electronic device 201 is not included within the coverage of a specific network with which the first communication device 202 has performed communication before turned off, even though the operation of the first communication device 202 is stored, the electronic device 201 may continually perform RRC connection with another network to perform communication with another network.

Hereinafter, examples of operations of the electronic device 201 and the first communication device 202 according to various embodiments will be described.

According to various embodiments, when the operation information backed up from the first communication device 202 needs to be updated, the electronic device 201 may autonomously update the operation information stored in the electronic device 201 and provide the updated operation information to the first communication device 202.

Figure 15:
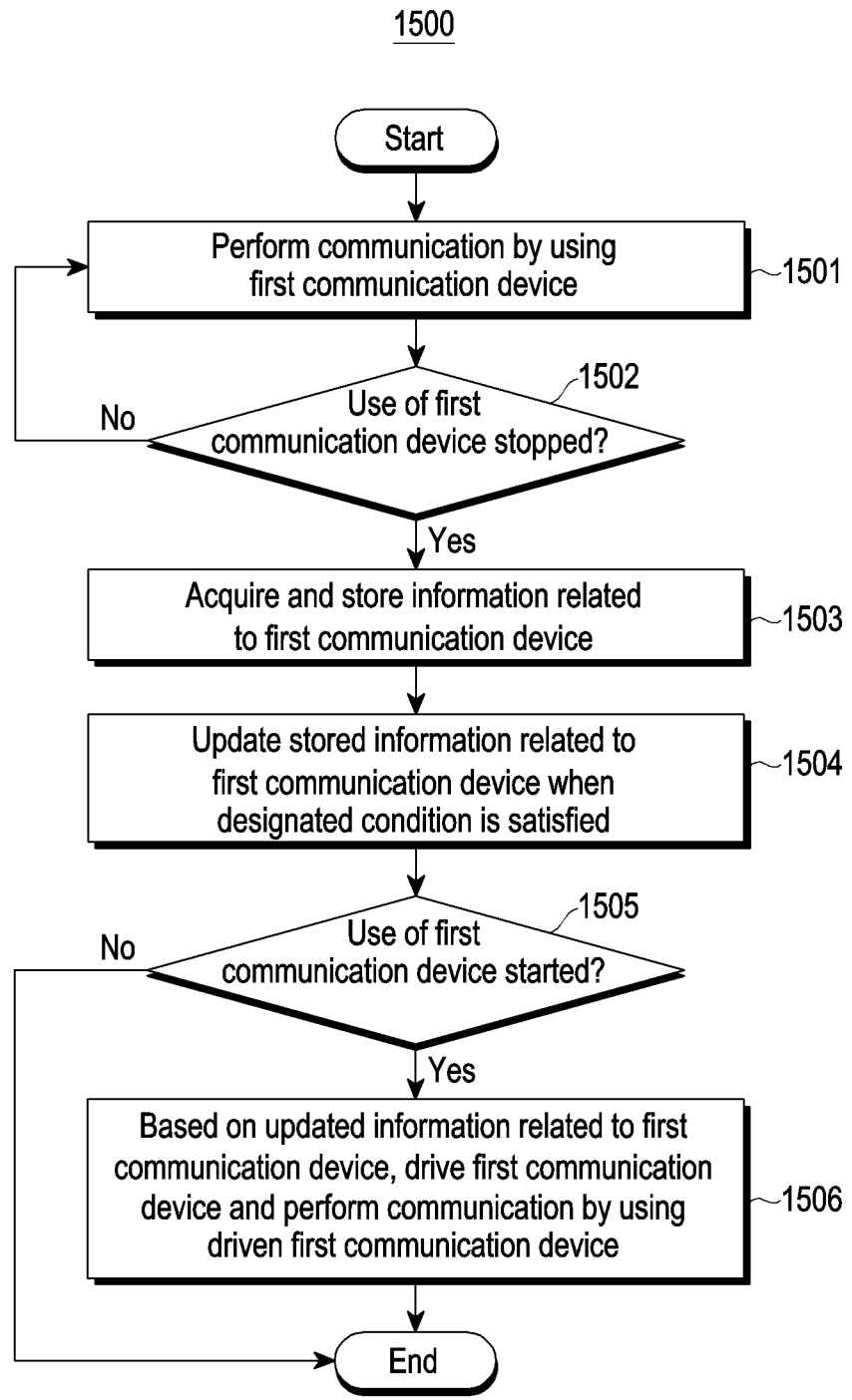
FIG. 15 is a flowchart illustrating an example of an operation of an electronic device according to various embodiments.

FIG. 15 is a flowchart 1500 for showing an example of an operation of an electronic device according to various embodiments.

According to various embodiments, the operations shown in FIG. 15 are not limited to the order as shown and may be performed in various orders. In addition, according to various embodiments, more operations than those shown in FIG. 15 may be performed or fewer than those shown in FIG. 15 or at least one operation may also be performed. Hereinafter, FIG. 15 will be described with reference to FIG. 16.

Figure 16:
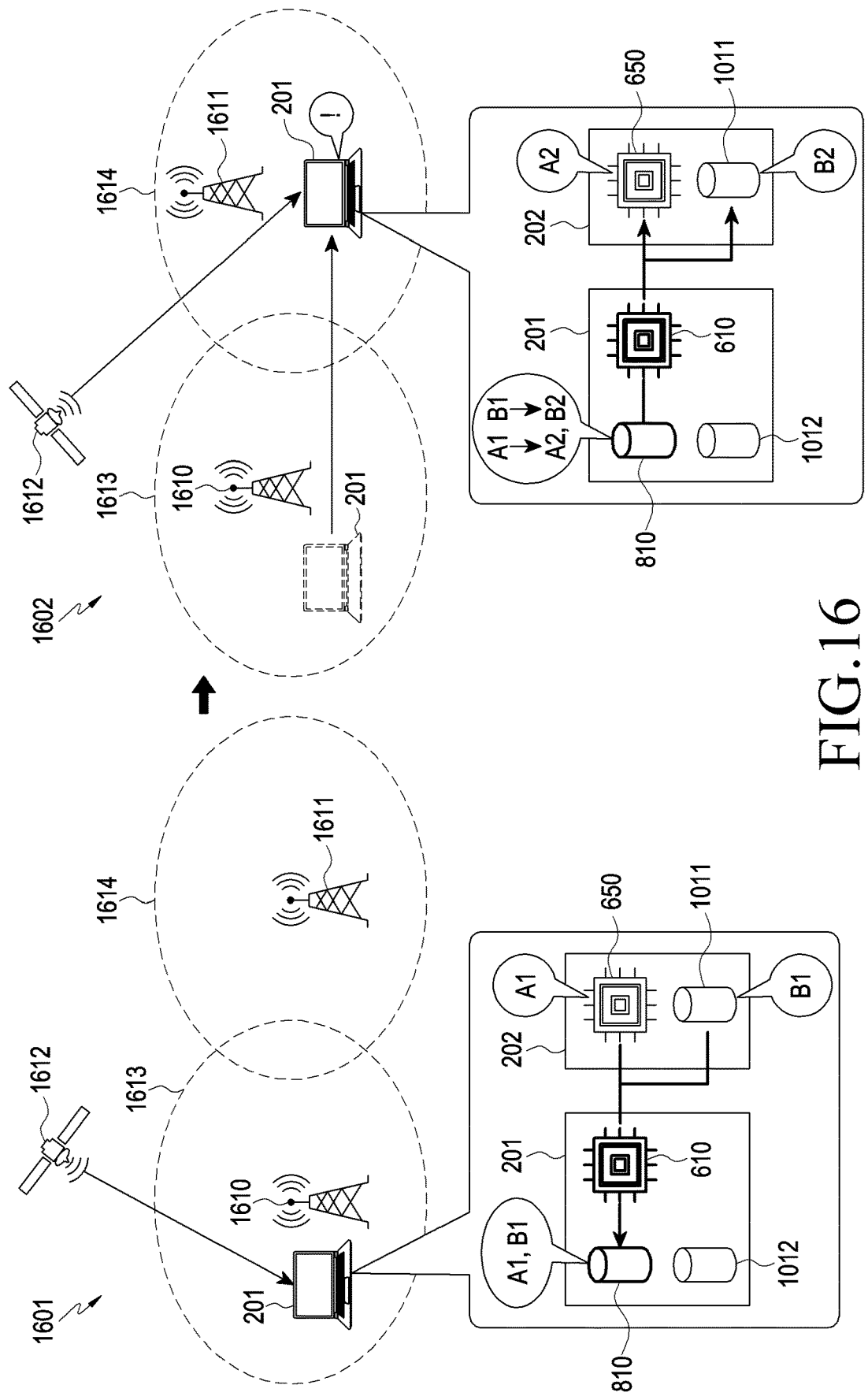
FIG. 16 illustrates an example of an operation of restoring a previous operation (previous state or previous work) of a first communication device, based on information received from an electronic device according to various embodiments.

FIG. 16 illustrates an example of an operation of restoring a previous operation (previous state or previous task) of a first communication device, based on information received from an electronic device according to various embodiments.

Referring to FIGS. 15 and 16, according to various embodiments, the electronic device 201 may perform communication by using the first communication device 202 in operation 1501. For example, in the case where when the electronic device 201 is electronically connected to the first communication device 202 through the connector (e.g., 503 of FIG. 5) of electronic device 201 described above when the first communication device 202 is inserted thereinto, the electronic device 201 may control (e.g., control the first converter circuit) based on the electrical connection to the first communication device 202 such that power is transmitted to the first communication device 202. The first communication device 202 may be booted and driven based on the transmission of power. The electronic device 201 may perform communication with a specific network (e.g., the first base station 1610) as shown in 1601 of FIG. 16, based on a communication scheme supported by the first communication device 202, by using the driven first communication device 202. The location of the electronic device 201 may be located within the coverage 1613 (or service range) of the specific network (e.g., the first base station 1610), and the electronic device 201 may perform communication with the specific network, based on the execution of the RRC connection operation with the specific network by using the first communication device 202. Operation 1501 of the electronic device 201 may be performed in the same manner as operations 701 and 901 to 905 of the electronic device 201 described above, and thus a redundant description will be omitted.

According to various embodiments, the electronic device 201 may identify in operation 1502 whether the use of the first communication device 202 is stopped, and when the cessation of the use of the first communication device 202 is identified, the electronic device 201 may acquire and store operation information associated with the first communication device 202 in operation 1503. For example, the electronic device 201 may identify occurrence of a first event configured to stop the use of the first communication device 202. Since the operation of identifying the occurrence of the first event in the electronic device 201 may be performed as in operation 906 of the electronic device 201, a redundant description will be omitted. Based on the identification of the occurrence of the first event, the electronic device 201 may store information (e.g., A1) stored in the second processor 650 (e.g., register) of the first communication device 202 and information (e.g., A2) stored in the memory 1011 (e.g., RAM) in a specific region (e.g., hibernation region) of the specific memory 810 among a plurality of memories (e.g., 810 and 1012) of the electronic device 201, as shown in 1601 of FIG. 16. For example, the information stored in the second processor 650 (e.g., register) and the information stored in the memory 1011 (e.g., RAM) may be information respectively generated and/or updated in the second processor 650 and the memory 1011 when the first communication device 202 performs communication with the specific network (e.g., the first base station 1610). Since the operation information associated with the first communication device 202, backed up in the electronic device 201, is the same as described above with reference to FIG. 13, a redundant description thereof will be omitted. The electronic device 201 may refrain from transmission of power to the first communication device 202, and the first communication device 202 may be turned off.

In operation 1502, when the cessation of the use of the first communication device 202 is not identified (i.e., when maintenance of the use of the first communication device 202 is identified), the electronic device 201 may continue to maintain the use of the first communication device 202.

According to various embodiments, in operation 1504, when a predetermined condition is satisfied, the electronic device 201 may update the stored information associated with the first communication device 202. For example, the satisfaction of the predetermined condition may include satisfaction of the condition configured such that the information (e.g., information of the second processor 650 and information of the memory 1011) related to the first communication device 202 and stored in the electronic device 201 is updated. In other words, the satisfaction of the predetermined condition may include a case where a situation of the communication performed before the first communication device 202 of the electronic device 201 is turned off is changed. For example, the satisfaction of the predetermined condition may include a case where the electronic device 201 is located outside the coverage 1613 of a specific network (e.g., the first base station 1610) with which the communication is performed, and is located within the coverage 1614 of another network (e.g., the second base station 1611). The electronic device 201 may continuously (or periodically) monitor the location of the electronic device 201 while the first communication device 202 is turned off, and may determine whether the location of the electronic device 201 is included within the coverage 1613 of a specific network. For example, the electronic device 201 may monitor the location of the electronic device 201, based on data received from a satellite 1612 by using a GPS device, as shown in 1601 to 1602 of FIG. 16. Without being limited thereto, the location of the electronic device 201 may also be monitored using a Wi-Fi communication device and/or a WLAN communication device. As shown in 1602 of FIG. 16, when the electronic device 201 identifies whether the location of the electronic device 201 is located outside the coverage 1613 of a specific network (e.g., the first base station 1610), and is located within the coverage 1614 of another network (e.g. the second base station 1611), the electronic device 201 may update at least one of information of the memory 1011 (e.g., B1) or information (e.g., A1) of the second processor 650, stored in the ROM of the electronic device 201. For example, the electronic device 201 may identify the information on the specific network (e.g., the first base station 1610) included in the stored information (e.g., B1) of the memory 1011 of the first communication device 202 and may update the identified information into information (e.g., B2) on another network (e.g., the second base station 1611). Without being limited thereto, the electronic device 201 may update the information (e.g., A1) of the second processor 650 stored in the ROM into another information (e.g., A2). When the first communication device 202 is driven based on the updated information, the operational load for communication with another network (e.g., the second base station 1611) of the first communication device 202 can be reduced.

According to various embodiments, the electronic device 201 may identify in operation 1505 whether the use of the first communication device 202 is started, and when the start of the use of the first communication device 202 is identified, in operation 1506, the electronic device 201 may drive the first communication device 202, based on the updated information related to the first communication device 202 and may perform communication by using the driven first communication device 202. For example, the electronic device 201 may transmit power and the updated information (e.g., information of the second processor 650 and information of the memory 1011) related to the first communication device 202 and stored in the memory 1012, to the first communication device 202, based on the identification of the second event configured to start the use of the first communication device 202. The first communication device 202 may perform only a part of the booting operation, based on the power, and may be driven in a state an operation for communication with the second base station 1611 is performable based on the received updated information. The electronic device 201 may communicate with another network (e.g., the second base station 1611) by using the driven first communication device 202.

Various embodiments may provide an electronic device (e.g., 201 of FIG. 2) including a connector into which a first communication device (e.g., 202 of FIG. 2) can be inserted, a second communication device (e.g., 203 of FIG. 2), a memory (e.g., 810 of FIG. 8), and at least one processor (e.g., 610 of FIG. 8), and the at least one processor may be configured to perform control such that first power is transferred to the first communication device (e.g., 202 of FIG. 2) connected through the connector, transmit and/or receive first data to and/or from a network by an use of the first communication device (e.g., 202 of FIG. 2), based on an occurrence of a first event configured to stop the use of the first communication device (e.g., 202 of FIG. 2) while the use of the first communication device (e.g., 202 of FIG. 2), obtain information related to an operation of the first communication device (e.g., 202 of FIG. 2) from the first communication device (e.g., 202 of FIG. 2) to store the acquired information related to the operation in the memory and refrain from transferring the first power to the first communication device (e.g., 202 of FIG. 2), based on refraining from transferring the first power to the first communication device (e.g., 202 of FIG. 2), transmit and/or receive second data by an use of the second communication device (e.g., 203 of FIG. 2), and based on an occurrence of a second event configured to start the use of the first communication device (e.g., 202 of FIG. 2) while the use of the second communication device (e.g., 203 of FIG. 2), refrain from the use of the second communication device (e.g., 203 of FIG. 2), perform control such that second power is transferred to the first communication device, and transfer the obtained information related to the operation, stored in the memory, to the first communication device (e.g., 202 of FIG. 2) through the connector.

In the electronic device (e.g., 201 of FIG. 2) according to various embodiments, the information related to the operation of the first communication device (e.g., 202 of FIG. 2) may include information related to a communication being performed by the first communication device (e.g., 202 of FIG. 2) before refraining from transferring the first power to the first communication device (e.g., 202 of FIG. 2) is suppressed.

In the electronic device (e.g., 201 of FIG. 2) according to various embodiments, the information related to an operation of the first communication device (e.g., 202 of FIG. 2) may include state information of a first processor of the first communication device (e.g., 202 of FIG. 2) and state information of a first memory of the first communication device (e.g., 202 of FIG. 2), which are updated while the first communication device (e.g., 202 of FIG. 2) performs the communication.

In the electronic device (e.g., 201 of FIG. 2) according to various embodiments, the stored information related to the first processor may include at least one of stack information or a program counter stored, at a time point when the first communication module is turned off, in at least one register included in the first processor, and the stored information related to the first memory may include information on a base station with which the first communication device (e.g., 202 of FIG. 2) communicates at a time point when the first communication module is turned off.

In the electronic device (e.g., 201 of FIG. 2) according to various embodiments, the at least one processor may be configured to store, in a designated region of the memory, information related to the first processor of the first communication device (e.g., 202 of FIG. 2) and information related to the first memory of the first communication device (e.g., 202 of FIG. 2), and based on the occurrence of the second event, load the stored information related to the first processor in the first processor of the first communication device (e.g., 202 of FIG. 2) and load the stored information related to the first memory in the first memory of the first communication device (e.g., 202 of FIG. 2).

In the electronic device (e.g., 201 of FIG. 2) according to various embodiments, the designated region of the memory may be a region preconfigured for back-up of the operation information.

In the electronic device (e.g., 201 of FIG. 2) according to various embodiments, the at least one processor may be configured to, based on driving the first communication device (e.g., 202 of FIG. 2) by a booting operation performed by the first communication device (e.g., 202 of FIG. 2), based on transmission of the first power, transmit and/or receive the first data by using the driven first communication device (e.g., 202 of FIG. 2), and based on driving the first communication device (e.g., 202 of FIG. 2) by only a part of the booting operation performed by the first communication device (e.g., 202 of FIG. 2), based on the second power, the acquired information related to the first processor, and the acquired information related to the first memory, transmit and/or receive third data by using the driven first communication device (e.g., 202 of FIG. 2).

In the electronic device (e.g., 201 of FIG. 2) according to various embodiments, the first communication device (e.g., 202 of FIG. 2) may be configured to, based on the loaded information related to the first processor and the loaded information related to the first memory, perform only a part of the booting operation and restore the operation related to the communication being performed before refraining from transferring the first power.

In the electronic device (e.g., 201 of FIG. 2) according to various embodiments, the at least one processor may be configured to transmit and/or receive the first data by using first wireless communication, based on the first communication device (e.g., 202 of FIG. 2), and transmit and/or receive the second data by using second wireless communication, based on the second communication device (e.g., 203 of FIG. 2).

In the electronic device (e.g., 201 of FIG. 2) according to various embodiments, the first event may be an event configured to induce the use of the second wireless communication, and the second event may be an event configured to induce the use of the first wireless communication.

In the electronic device (e.g., 201 of FIG. 2) according to various embodiments, the first event may include an event configured to receive, from the first communication device (e.g., 202 of FIG. 2), information indicating that the first communication device (e.g., 202 of FIG. 2) is unavailable.

Various embodiments may provide a method for operating an electronic device (e.g., 201 of FIG. 2), the method including performing control such that first power is transferred to the first communication device (e.g., 202 in FIG. 2) connected through the connector, transmitting and/or receiving first data to and/or from a network by an use of the first communication device (e.g., 202 of FIG. 2), based on an occurrence of a first event configured to stop the use of the first communication device (e.g., 202 of FIG. 2) while the use of the first communication device (e.g., 202 of FIG. 2), obtaining information related to an operation of the first communication device (e.g., 202 of FIG. 2) from the first communication device (e.g., 202 of FIG. 2) to store the obtained information related to the operation in the memory and refraining from transferring the first power provided to the first communication device (e.g., 202 of FIG. 2), based on refraining from transferring the first power provided to the first communication device (e.g., 202 of FIG. 2), transmitting and/or receiving second data by using the second communication device (e.g., 203 of FIG. 2), and based on an occurrence of a second event configured to start the use of the first communication device (e.g., 202 of FIG. 2) while the use of the second communication device (e.g., 203 of FIG. 2), refraining from the use of the second communication device (e.g., 203 of FIG. 2), performing control such that second power is transmitted to the first communication device, and transferring the acquired information related to the operation, stored in the memory, to the first communication device (e.g., 202 of FIG. 2) through the connector.

In the operation method according to various embodiments, the information related to an operation of the first communication device (e.g., 202 of FIG. 2) may include information related to communication being performed by the first communication device (e.g., 202 of FIG. 2) before refraining from transferring the first power to the first communication device (e.g., 202 of FIG. 2).

In the operation method according to various embodiments, the information related to the operation of the first communication device (e.g., 202 of FIG. 2) may include information related to the first processor of the first communication device (e.g., 202 of FIG. 2) and information related to the first memory of the first communication device (e.g., 202 of FIG. 2), which are updated while the first communication device (e.g., 202 of FIG. 2) performs the communication.

In the operation method according to various embodiments, the stored information related to the first processor may include at least one of stack information or a program counter stored, at a time point when the first communication module is turned off, in at least one register included in the first processor, and the stored information related to the first memory may include information on a base station with which the first communication device (e.g., 202 of FIG. 2) communicates at a time point when the first communication module is turned off.

The operation method according to various embodiments may include storing, in a designated region of the memory, information related to the first processor of the first communication device (e.g., 202 of FIG. 2) and information related to the first memory of the first communication device (e.g., 202 of FIG. 2), and based on the occurrence of the second event, loading the stored information related to the first processor in the first processor of the first communication device (e.g., 202 of FIG. 2) and loading the stored information related to the first memory in the first memory of the first communication device (e.g., 202 of FIG. 2).

In the operation method according to various embodiments, the designated region of the memory may be a region preconfigured for back-up of the operation information.

The operation method according to various embodiments may include, based on driving the first communication device (e.g., 202 of FIG. 2) by a booting operation performed by the first communication device (e.g., 202 of FIG. 2) based on transmission of the first power, transmitting and/or receiving the first data by using the driven first communication device (e.g., 202 of FIG. 2), and based on driving the first communication device (e.g., 202 of FIG. 2) by only a part of the booting operation performed by the first communication device (e.g., 202 of FIG. 2) based on the second power, the acquired information related to the first processor, and the acquired information related to the first memory, transmitting and/or receiving third data by using the driven first communication device (e.g., 202 of FIG. 2).

In the operation method according to various embodiments, the first communication device (e.g., 202 of FIG. 2) may be configured to, based on the loaded information related to the first processor and the loaded information related to the first memory, perform only a part of the booting operation and restore the operation related to the communication being performed before the transmission of the first power is suppressed.

Various embodiments may provide a communication device, which can be inserted into an external electronic device (e.g., 201 of FIG. 2), the communication device including a memory, and a processor, and the processor may be configured to receive first power from the external electronic device (e.g., 201 of FIG. 2) based on the insertion into the external electronic device (e.g., 201 of FIG. 2), perform a booting operation based on the received first power, perform at least one operation based on the completion of the booting operation, transmit state information of the processor and state information of the memory to the external electronic device (e.g., 201 of FIG. 2), based on occurrence of a first event configured to stop use of the first communication device (e.g., 202 of FIG. 2) while the at least one operation is performed, receive second power, state information of the processor, and state information of the memory from the external electronic device (e.g., 201 of FIG. 2), based on occurrence of a second event configured to start the use of the first communication device (e.g., 202 of FIG. 2), and perform only a part of the booting operation and restore execution of the at least one operation, based on the second power, the state information of the processor, and the state information of the memory.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a connector into which a first communication device can be at least partially inserted to form an electrical connection between the electronic device and the first communication device, wherein the first communication device includes a first processor, a first memory and a transceiver;
a second communication device which is embedded in the electronic device;
a second memory; and
at least one processor,
wherein the at least one processor is configured to:
supply power to the first communication device for a booting operation performed by the first communication device at least partially inserted into the connector,
transmit or receive first data to or from an external network device through the first communication device,
based on an occurrence of a first event while using the first communication device, obtain operation information of the first communication device from the first communication device to store the operation information in the second memory, and stop the supply of the power to the first communication device, wherein the operation information includes first information associated with the first processor and second information associated with a communication between the external network device and the first communication device through the transceiver,
based on stopping the supply of the power to the first communication device, transmit or receive second data through the second communication device, and
based on an occurrence of a second event different from the first event while using the second communication device, stop using the second communication device, supply the power to the first communication device, and transfer the operation information to the first communication device for reperforming a portion of the booting operation and refraining from reperforming a remaining portion of the booting operation by the first communication device.

2. The electronic device of claim 1,
wherein the first information comprises at least one of stack information or a program counter stored, at a time point when a first communication module is turned off, in at least one register included in the first processor, and
wherein the second information comprises information on a base station with which the first communication device communicates at the time point when the first communication module is turned off.

3. The electronic device of claim 2, wherein the at least one processor is further configured to:
store, in a designated region of the second memory, the first information and the second information, and
based on the occurrence of the second event, load the stored first information in the first processor of the first communication device and load the stored second information in the first memory of the first communication device.

4. The electronic device of claim 3, wherein the designated region of the memory is a region preconfigured for back-up of the operation information.

5. The electronic device of claim 1, wherein the at least one processor is configured to:
transmit or receive the first data by using first wireless communication, based on the first communication device; and
transmit or receive the second data by using second wireless communication, based on the second communication device.

6. The electronic device of claim 5,
wherein the first event is an event configured to induce the use of the second wireless communication, and
wherein the second event is an event configured to induce the use of the first wireless communication.

7. The electronic device of claim 6, wherein the first event includes an event configured to receive, from the first communication device, information indicating that the first communication device is unavailable.

8. The electronic device of claim 1, wherein the second event comprises an event for turning on the first communication device, an event in which use of the first communication supported by the first communication device is re-enabled, or an event in which an error or defect of the first communication device is repaired or restored.

9. A method for operating an electronic device, the method comprising:
supplying power to a first communication device through a connector of the electronic device for a booting operation performed by the first communication device at least partially inserted into the connector to form an electrical connection between the electronic device and the first communication device, wherein the first communication device includes a first processor, a first memory and a transceiver;

transmitting or receiving first data to or from an external network device through the first communication device;

based on an occurrence of a first event while using the first communication device, obtaining information related to an operation of the first communication device from the first communication device to store the operation information in a second memory of the electronic device and stopping the supply of the power to the first communication device, wherein the operation information includes first information associated with the first processor and second information associated with a communication between the external network device and the first communication device through the transceiver;

based on stopping the supply of the power to the first communication device, transmitting or receiving second data through a second communication device which is embedded in the electronic device; and based on an occurrence of a second event different from the first event while using the second communication device, stopping using the second communication device, supplying the power to the first communication device, and transferring the operation information to the first communication device for reperforming a portion of the booting operation and refraining from reperforming a remaining portion of the booting operation by the first communication device.

10. The method of claim 9, wherein the first information related to the first processor comprises at least one of stack information or a program counter stored, at a time point when a first communication module is turned off, in at least one register included in the first processor, and wherein the second information related to the first memory comprises information on a base station with which the first communication device communicates at the time point when the first communication module is turned off.

11. The method of claim 10, further comprising:

storing, in a designated region of the second memory, the first information related to the first processor of the first communication device and the second information related to the first memory of the first communication device; and based on the occurrence of the second event, loading the stored first information in the first processor of the first communication device and loading the stored second information in the first memory of the first communication device.

12. The method of claim 11, wherein the designated region of the memory is a region preconfigured for back-up of the operation information.

13. The method of claim 9, further comprising:

transmitting or receiving the first data by using first wireless communication, based on the first communication device; and transmitting or receiving the second data by using second wireless communication, based on the second communication device.

14. The method of claim 9, wherein the second event comprises an event for turning on the first communication device, an event in which use of the first communication supported by the first communication device is re-enabled, or an event in which an error or defect of the first communication device is repaired or restored.

* * * * *